US012127529B2

(12) United States Patent
Anderson et al.

(10) Patent No.: US 12,127,529 B2
(45) Date of Patent: Oct. 29, 2024

(54) AUTOMATED SELF-CLEANING LITTER BOX HAVING DISPOSIBLE RECEPTACLE AND METHODS

(71) Applicant: Spectrum Brands, Inc., Middleton, WI (US)

(72) Inventors: Darrin Anderson, Mauston, WI (US); Ron Wright, Baraboo, WI (US); Brent Demaske, Mauston, WI (US); Adam Favia, Reedsburg, WI (US); William D. Himes, Radford, VA (US)

(73) Assignee: Spectrum Brands, Inc., Middleton, WI (US)

( * ) Notice: Subject to any disclaimer, the term of this patent is extended or adjusted under 35 U.S.C. 154(b) by 809 days.

(21) Appl. No.: 16/973,668

(22) PCT Filed: Jun. 10, 2019

(86) PCT No.: PCT/US2019/036340
§ 371 (c)(1),
(2) Date: Dec. 9, 2020

(87) PCT Pub. No.: WO2019/245782
PCT Pub. Date: Dec. 26, 2019

(65) Prior Publication Data
US 2021/0251182 A1     Aug. 19, 2021

Related U.S. Application Data

(60) Provisional application No. 62/686,762, filed on Jun. 19, 2018.

(51) Int. Cl.
*A01K 1/01* (2006.01)

(52) U.S. Cl.
CPC .................................. *A01K 1/011* (2013.01)

(58) Field of Classification Search
CPC ............................ A01K 1/011; A01K 1/0107
See application file for complete search history.

(56) References Cited

U.S. PATENT DOCUMENTS 1,063,811 A      6/1913   Mascord
5,477,812 A *  12/1995   Waters ................ A01K 1/0114
                                                             119/166
5,775,258 A *   7/1998   Larsen ................ A01K 1/0114
                                                             294/1.3
(Continued)

FOREIGN PATENT DOCUMENTS

CN     108697064 A  * 10/2018 ........... A01K 1/0114
CN     110122341 A     8/2019
(Continued)

OTHER PUBLICATIONS

Office Action for Chinese Patent Application for Invention No. 201980048367.1 mailed Feb. 7, 2022, 12pgs.
(Continued)

*Primary Examiner* — Brady W Frazier
*Assistant Examiner* — Alanna K Peterson
(74) *Attorney, Agent, or Firm* — Merchant & Gould P.C.

(57) ABSTRACT

An automated self-cleaning litter box (20) includes a guide arrangement (114) to allow for slidably mounting a disposable litter receptacle (40) The litter box can include a ramp (30) with a catch basin (142) and removable mat (146).

20 Claims, 19 Drawing Sheets

(56) References Cited

U.S. PATENT DOCUMENTS

| | | |
|---|---|---|
| 5,996,533 A | 12/1999 | Gordon |
| 6,009,836 A | 1/2000 | Neary et al. |
| 6,082,302 A | 7/2000 | Thaler et al. |
| RE36,847 E | 9/2000 | Waters |
| 6,138,609 A | 10/2000 | Gordon |
| 6,205,954 B1 * | 3/2001 | Bogaerts .............. A01K 1/0114 119/166 |
| 6,234,112 B1 | 5/2001 | Emery |
| 6,289,847 B1 | 9/2001 | Carlisi |
| 6,378,461 B1 | 4/2002 | Thaler et al. |
| 6,401,661 B1 | 6/2002 | Emery |
| 6,561,132 B2 | 5/2003 | Gordon et al. |
| D480,519 S * | 10/2003 | Firth ..................... D30/162 |
| 7,017,519 B1 | 6/2006 | Deasy et al. |
| 7,261,058 B2 | 8/2007 | Gillis et al. |
| 7,263,951 B2 | 9/2007 | Gillis et al. |
| 7,290,499 B2 | 11/2007 | Emery |
| 7,328,118 B2 | 2/2008 | Liu et al. |
| 7,487,742 B2 | 2/2009 | Waters |
| 7,628,118 B1 | 12/2009 | Nottingham et al. |
| 7,647,889 B2 | 1/2010 | Horanoff |
| 7,669,555 B2 | 3/2010 | Emery |
| 7,673,585 B1 * | 3/2010 | Emmi .................. A01K 1/0107 119/168 |
| 7,762,213 B2 | 7/2010 | Cook et al. |
| 7,798,101 B2 | 9/2010 | Waters |
| 7,997,230 B2 | 8/2011 | Cook et al. |
| 8,028,659 B2 | 10/2011 | Cook et al. |
| 8,061,301 B1 | 11/2011 | Tsengas |
| 8,109,237 B1 | 2/2012 | Tsengas et al. |
| 8,109,238 B2 | 2/2012 | Casiana |
| 8,156,895 B2 | 4/2012 | Caputa et al. |
| 8,161,908 B2 | 4/2012 | Cook et al. |
| 8,166,918 B2 | 5/2012 | Cook et al. |
| 8,166,919 B2 | 5/2012 | Cook et al. |
| 8,166,920 B2 | 5/2012 | Cook et al. |
| 8,235,006 B2 | 8/2012 | Lipscomb et al. |
| 8,235,434 B2 | 8/2012 | Lipscomb et al. |
| 8,381,687 B2 | 2/2013 | Tsengas |
| 8,567,348 B2 | 10/2013 | Cook et al. |
| 8,757,094 B2 | 6/2014 | Baxter et al. |
| 8,839,741 B2 | 9/2014 | Cheek |
| 9,163,777 B1 | 10/2015 | Knecht |
| 9,179,643 B2 | 11/2015 | Loveday et al. |
| 9,185,879 B2 | 11/2015 | Bellini et al. |
| 9,433,185 B2 | 9/2016 | Baxter et al. |
| 9,433,186 B2 | 9/2016 | Romano |
| 9,491,926 B2 | 11/2016 | Lipscomb et al. |
| 9,526,226 B2 | 12/2016 | Plazarte et al. |
| 9,681,639 B2 | 6/2017 | Mandel |
| 10,098,315 B2 | 10/2018 | Couto |
| 10,206,370 B2 | 2/2019 | Huang |
| 10,231,431 B1 | 3/2019 | Turner |
| 10,321,659 B1 | 6/2019 | Turner |
| 10,398,124 B2 | 9/2019 | Do |
| 10,399,045 B2 | 9/2019 | Altomare |
| 10,455,805 B2 | 10/2019 | Robbins |
| 2003/0217700 A1 | 11/2003 | Northrop et al. |
| 2006/0288948 A1 * | 12/2006 | Ikegami .............. A01K 1/0107 119/167 |
| 2007/0056520 A1 * | 3/2007 | Hamada .............. A01K 1/0114 119/161 |
| 2007/0056521 A1 | 3/2007 | Caputa et al. |
| 2014/0069343 A1 * | 3/2014 | Loveday .............. A01K 1/0132 119/166 |
| 2015/0122189 A1 | 5/2015 | Sweetman |
| 2015/0143750 A1 | 5/2015 | Jalbert et al. |
| 2015/0173324 A1 | 6/2015 | Cameron et al. |
| 2015/0327508 A1 | 11/2015 | Maddox |
| 2015/0334982 A1 | 11/2015 | Fogle |
| 2015/0334983 A1 | 11/2015 | Kuiper et al. |
| 2016/0044888 A1 | 2/2016 | Elfindale |
| 2016/0219828 A1 | 8/2016 | Goerz |
| 2016/0286752 A1 | 10/2016 | Fogle |
| 2016/0374306 A1 | 12/2016 | Romano |
| 2017/0083018 A1 | 3/2017 | Womble et al. |
| 2017/0118945 A1 | 5/2017 | Cook et al. |
| 2018/0199537 A1 | 7/2018 | Elfindale |
| 2018/0228123 A1 | 8/2018 | Wees |
| 2019/0014739 A1 | 1/2019 | Darmanjian |
| 2019/0059315 A1 | 2/2019 | Brown |
| 2019/0191660 A1 | 6/2019 | Takada et al. |
| 2019/0191662 A1 | 6/2019 | Takada et al. |
| 2019/0208738 A1 | 7/2019 | Brown |
| 2019/0230892 A1 | 8/2019 | Chang et al. |
| 2019/0313596 A1 | 10/2019 | Cornacchia |
| 2019/0357494 A1 | 11/2019 | Garrett et al. |
| 2019/0373844 A1 | 12/2019 | Ward et al. |
| 2020/0015448 A1 | 1/2020 | Kiser |
| 2020/0022331 A1 | 1/2020 | Ahn |
| 2020/0060221 A1 | 2/2020 | Fan et al. |
| 2020/0120892 A1 | 4/2020 | Suchkov et al. |
| 2020/0281154 A1 | 9/2020 | Li |

FOREIGN PATENT DOCUMENTS

| | | |
|---|---|---|
| CN | 110122342 A | 8/2019 |
| CN | 110122343 A | 8/2019 |
| CN | 111587795 A | 8/2020 |
| CN | 111771732 A | 10/2020 |
| CN | 111802256 A | 10/2020 |
| KR | 10-1961381 B1 | 7/2019 |
| KR | 2020-0119093 A | 10/2020 |
| WO | 2019237105 A1 | 12/2019 |
| WO | 2020/091144 A1 | 5/2020 |
| WO | 2020/219849 A1 | 10/2020 |

OTHER PUBLICATIONS

International Search Report and Written Opinion for No. PCT/US2019/036340 mailed Dec. 9, 2019.

* cited by examiner

AUTOMATED SELF-CLEANING LITTER BOX HAVING DISPOSIBLE RECEPTACLE AND METHODS

This application is a National Stage application of PCT International patent application No. PCT/US2019/036340, filed Jun. 10, 2019, which claims priority to U.S. Provisional Patent Application No. 62/686,762, filed Jun. 19, 2018, which applications are incorporated herein by reference. To the extent appropriate, a claim of priority is made to each of the above disclosed applications.

TECHNICAL FIELD

This disclosure relates to an automated self-cleaning litter box, a disposable receptacle used with the litter box, and methods of use.

BACKGROUND

Pet owners have long sought a convenient and sanitary way to deal with pet waste generated inside the household. Many pet owners train their pets to expel waste in a container having a disposable absorbent medium. The absorbent medium forms clumps that the pet owner later removes. Cat litter includes heavy clay particles that absorb pet waste and are easily carried from the litter box by the paws of a pet.

The traditional litter box requires pet owners to clean the litter box by manually sifting clumps of pet waste from the litter with a hand held plastic comb or scoop. The pet owner runs the comb through the litter and deposits the pet waste in a separate bin for disposal. This places pet owners in close proximity to pet waste, a situation many pet owners find both unsanitary and unpleasant.

In an effort to avoid the shortcomings of the traditional litter box, pet owners have turned to automated self-cleaning litter boxes, which relieved pet owners of manually sifting litter clumps from litter. In many types of systems, to separate the clumps, the self-cleaning litter box employs a mechanical driven comb, a pet sensor, and a waste receptacle to store the litter clumps. As a pet expels waste in an automatic self-cleaning litter box, the pet sensor detects the presence of the pet, and sometime later after the sensor ceases to detect the presence of the pet, the mechanically driven comb automatically sifts the larger litter clumps from the smaller loose litter particles. As the comb sifts through the litter, it collects the clumps that are too large to pass through the space between the tines of the comb. The comb deposits the clumps in a waste bin and leaves the unused litter in the litter box.

SUMMARY

A disposable receptacle for holding used pet litter and an automated self-cleaning litter box for disposing of used litter into the disposable receptacle are provided to improve the prior art.

In one aspect, a disposable receptacle for holding used pet litter includes a container and a removable lid. The container defines an interior volume and has a bottom wall, first and second opposing side walls extending from the bottom wall, and first and second opposing end walls extending from the bottom wall and between the first and second side wall. The container has an access opening surrounded by a rim defined by the free ends of the first and second side walls and first and second end walls. The removable lid covers the access opening. The lid has an interior side in communication with the interior volume of the container and an opposite exterior side facing away from the interior volume of the container. The lid has a lock tab projecting from the exterior side constructed and arranged to mate with a cover member of a litter box. The container and lid have radially projecting flanges with an open passage in between sized to receive a guide rail in a litter box, when operably positioned therein.

The first and second end walls each may have an outwardly projecting protuberance each sized to be received by a recess in a litter box. The container and lid may have a flap lock arrangement to selectively secure the container and lid together.

The flap lock arrangement includes one or more foldable flaps on the container or lid, and one or more receivers on the other of the container or lid to receive the one or more flaps.

The container may have at least two foldable flaps, and the lid may have at least two receivers sized to receive the flaps.

In some embodiments, the flanges on the container extend radially from the rim adjacent the first and second side wall. The lid has opposite first and second side edges and opposite first and second end edges between the first and second side edges. The flanges on the lid extend radially from the first and second end edges of the lid.

The lock tab may have a free end and ramped surface extending downward from the free end and toward a remaining portion of the lid.

In some embodiments, the lid has opposite first and second side edges and opposite first and second end edges between the first and second side edges. A lock tab is located along one of the first and second side edges.

In some cases, the lock tab is centered between the first and second end edges of the lid.

The lock tab may have a triangular cross-sectional profile, in some embodiments.

In some embodiments, the container includes a finger tab extending radially outwardly from the rim adjacent one of the first and second side walls.

The finger tab may be centered between the first and second end walls of the container.

In another aspect, an automated self-cleaning litter box for automatically disposing of used litter into a disposable receptacle is provided. The litter box includes an opened top box with a floor and a surrounding wall defining an interior sized to be accessible by an animal and for holding litter. A motorized drive unit is coupled to the box. A rake is driven by the drive unit within the box interior. The rake has a cam secured thereto. A movable cover member is constructed and arranged to cover and expose an opening of a litter receptacle. The cover member is moveable responsive to the engagement by the cam. A guide rail arrangement is in the interior of the box and is constructed and arranged to receive the litter receptacle.

In some embodiments, the cover member has a fastener for selectively removably securing to a lid of the receptacle.

The fastener and the cover member may include an open aperture sized to accommodate a lock tab of the lid of the receptacle.

The cover member is coupled to a pair of cam followers pivotably secured to the box.

In some embodiments, the guide rail arrangement includes rails projecting from a surface of the cam followers in a direction toward the box interior and away from the surrounding wall of the box.

The surrounding wall of the box includes a front wall extending from the floor. The front wall has a free end with a lip projecting away from the interior of the box and positioned to hold the litter receptacle.

The box defines a litter receptacle compartment positioned on an opposite side of the front wall from the box interior. The litter receptacle compartment has a base arrangement with openings sized to removable receive projecting protuberances of the litter receptacle.

The base arrangement of the litter receptacle compartment may include a pair of slanted slide surfaces to guide the litter receptacle into place into the compartment.

In some arrangements, there is further provided a walking ramp removably extending from the box to a surface outside of the box.

The walking ramp may include a base surface and a plurality of walls extending from the base surface to form a catch basin. A porous mat removably covers the catch basin.

In some embodiments, the surrounding wall includes a pocket sized to receive a removable scoop.

The removable scoop may be positioned in the pocket, with a top of the scoop being flush with a top surface of the surrounding wall.

In another aspect, a litter box is provided including an open topped box with a floor and a surrounding wall defining an interior sized to be accessible by an animal and for holding litter. A walking ramp extends from the box to a surface outside of the box. The walking ramp includes a base surface and a plurality of walls extending from the base surface to form a catch basin. A porous mat is removably covering the catch basin.

In some embodiments, the litter box further includes a motorized drive unit coupled to the box; a rake driven by the drive unit within the box interior and having a cam secured thereto; and a movable cover member constructed and arranged to cover and expose an opening of a litter receptacle, with the cover member being movable responsive to engagement by the cam.

In some embodiments, the litter box may further include a guide rail arrangement in the interior of the box constructed and arranged to slidably receive a litter receptacle into a litter receptacle compartment.

In another aspect, an automated self-cleaning litter box for automatically disposing of used litter into a disposable litter receptacle is provided. The litter box includes an opened topped box with a floor and a surrounding wall defining an interior sized to be accessible by an animal and for holding litter. The surrounding wall of the box includes a front wall extending from the floor. The box defines a litter receptacle compartment positioned on an opposite side of the front wall of the box interior. A guide rail arrangement in the interior of the box is constructed and arranged to slidably receive the litter receptacle into the litter receptacle compartment. A motorized drive unit is coupled to the box. A rake unit is driven by the drive unit within the box interior and has a cam secured thereto. A cover member is constructed and arranged to cover and expose an opening of the litter receptacle. The cover member is movable responsive to engagement by the cam.

In some arrangements, the front wall has a free end with a lip projecting away from the interior of the box and positioned to hold the litter receptacle.

The litter receptacle compartment has a base arrangement and can have openings sized to removably receive projecting protuberances of the litter receptacle.

The cover member has a fastener for selectively removably securing to a lid of the receptacle.

The base arrangement of the litter receptacle compartment includes a pair of slanted slide surfaces to guide the litter receptacle into place in the compartment.

The cover member may be coupled to a pair of cam followers pivotably secured to the box.

The guide rail arrangement can include rails projecting from a surface of the cam followers in a direction toward the box interior and away from the surrounding wall of the box.

In another aspect, a method of positioning a disposable litter receptacle having a container and a lid into an automated self-cleaning litter box is provided. The method includes sliding the container between a bottom base arrangement and a lower side of a guide rail until protuberances extending from the container are received within openings in the bottom base arrangement. Next, there is a step of removably attaching the lid to a cover member secured to the litter box.

The method may further include a step of, before removably attaching the lid to a cover member, sliding the lid over an upper side of the guide rail.

The step of sliding the litter receptacle may include positioning an end rim of a side wall of the litter receptacle against an upper lip at a free end of the front wall of the litter box.

The step of removably attaching the lid may include positioning a lock tab on the lid into an open aperture in the cover member.

Not all the features described herein must be incorporated in an arrangement for the arrangement to have some selective advantage, according to the present disclosure.

DETAILED DESCRIPTION

A. General Overview

Figure 1:
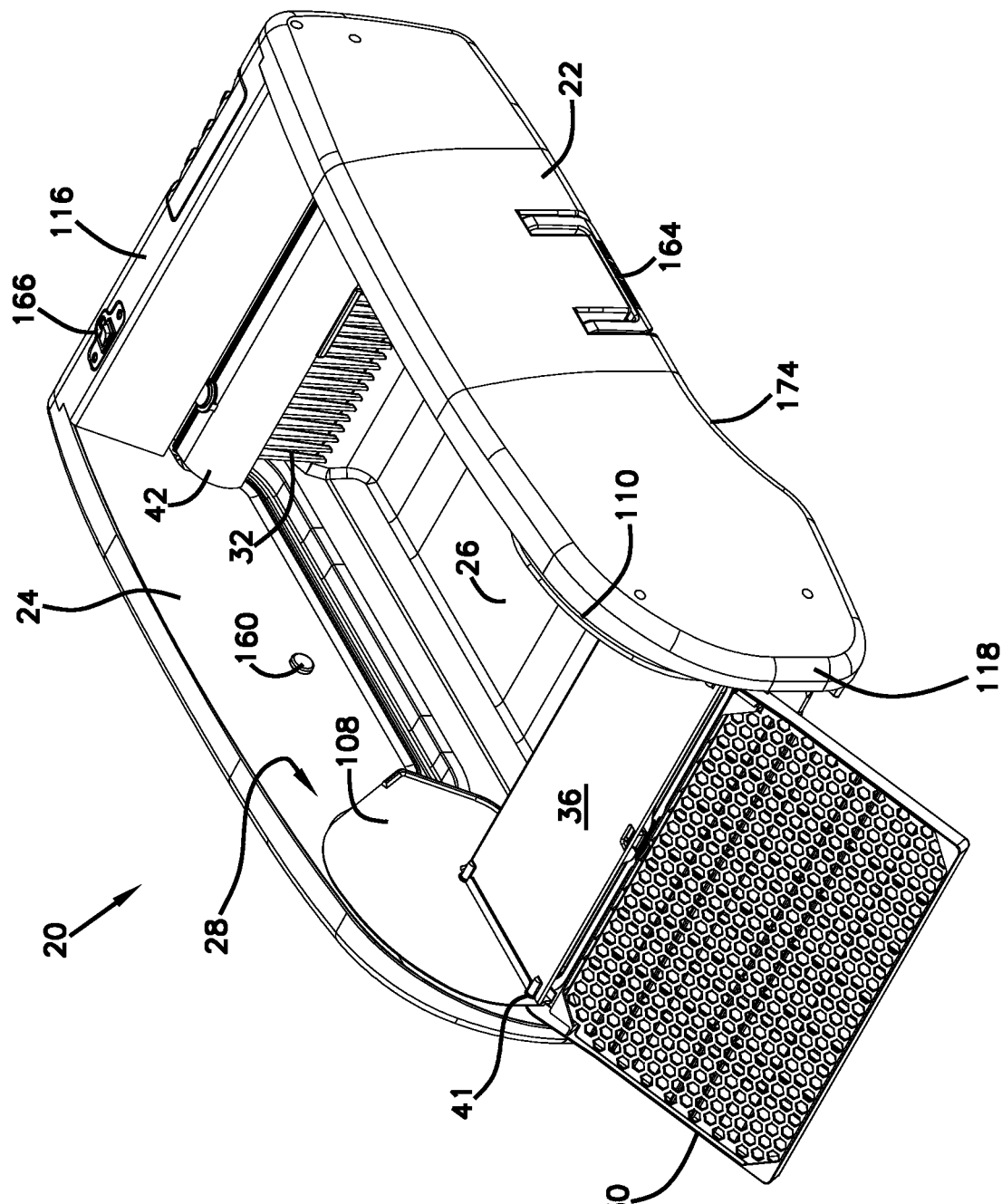
FIG. 1 is a perspective view of a first embodiment of an automated self-cleaning litter box, constructed in accordance with principles of this disclosure.

FIG. 1 illustrates an example automated self-cleaning litter box at 20, which overcomes the problems of the prior art. In FIG. 1, the litter box 20 includes an opened topped box 22. The box 22 has a surrounding wall 24 and a bottom floor 26 to define an interior 28 within the surrounding wall 24, which is sized to be accessible by an animal, such as a cat, and for holding litter.

Figure 5:
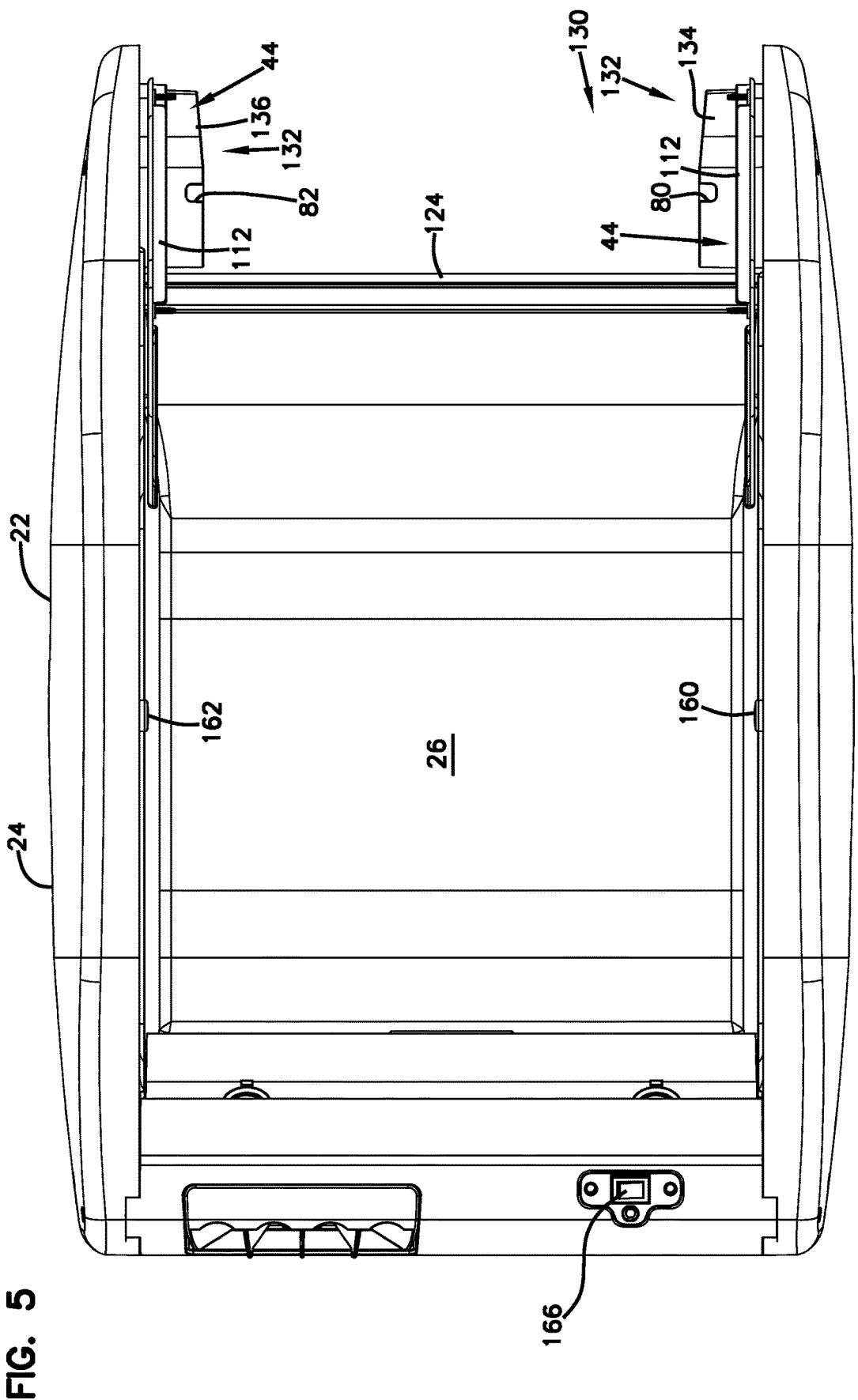
FIG. 5 is a top view of the litter box of FIG. 4.

In the example shown, the surrounding wall 24 forms a generally rectangular shape, when viewed in plan view (FIG. 5). Other shapes are possible. The surrounding wall 24 has a height from the floor 26 that is sufficiently short that an animal, such as a cat, could step or jump over it to access the interior 28. However, an optional ramp 30 is also provided to allow the animal to walk into the interior 28, without having to step or jump over the wall 24.

In FIG. 1, a sieve or rake 32 is visible in the interior volume 28 at an end of the box 22 opposite of the ramp 30. The rake is used to move through the litter and separate any clumps from a remaining part of the litter. The rake 32 is driven by a motorized drive unit 34 (FIG. 16) coupled to the box 22. The motorized drive unit 34 can be as described in U.S. Pat. No. 8,156,895, incorporated herein by reference.

Figure 3:
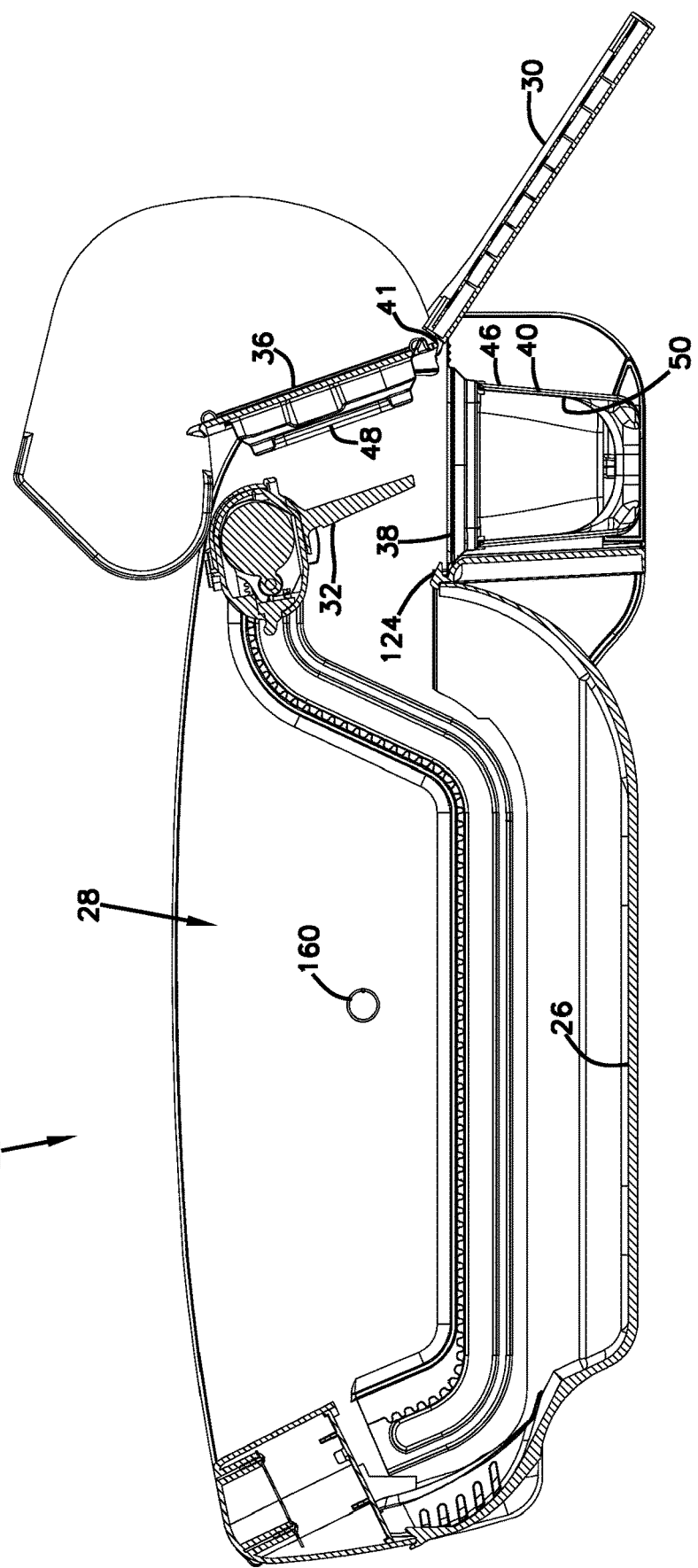
FIG. 3 is a cross-sectional view of the litter box of FIG. 1 and showing the litter box performing a cleaning operation.

A movable cover member 36 can be seen in FIG. 1. The cover member 36 is constructed and arranged to cover and expose an opening 38 of a litter receptacle 40 (FIG. 3). The cover member 36, in this embodiment, is pivotable relative to the box 22 at a pivot point 41, such that the pivot point 41 is at an edge of the surrounding wall 24 and adjacent the walking ramp 30. The cover member 36 is movable responsive to engagement by a cam 42, which is secured to the rake 32.

Figure 4:
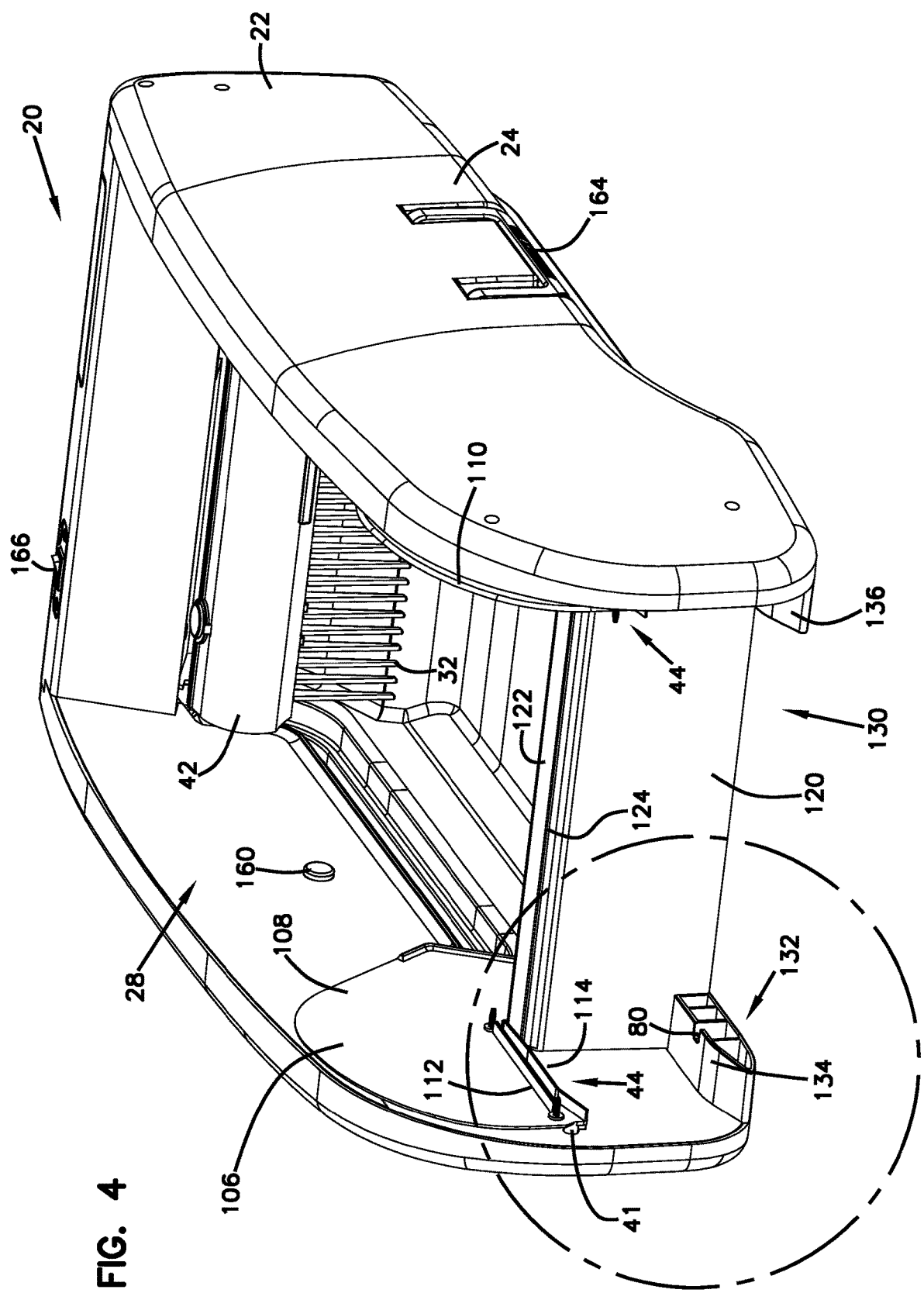
FIG. 4 is a perspective view of the litter box of FIG. 1 with certain portions removed to show a receptacle container compartment.

The litter box 20 further includes a guide rail arrangement 44 (FIG. 4). The guide rail arrangement 44 is in the interior of the box 22 and is constructed and arranged to receive the litter receptacle 40.

B. Example Litter Receptacle, FIGS. 9-14

In FIGS. 9-14, an example embodiment of litter receptacle 40 is illustrated. Litter receptacle 40 is made from inexpensive materials, such that it is considered disposable. For example, the receptacle 40 can be made from inexpensive plastic, generally polymer material. The receptacle 40, upon being filled with used litter, can be removed from the litter box 20, disposed of, and replaced with a new receptacle 40.

The receptacle 40 includes a container 46 and a removable lid 48. The container 46 defines an interior volume 50. The interior volume 50 is for holding and containing used litter.

The container 46 has a bottom wall 52 (FIGS. 12 and 13) and first and second opposing side walls 54, 56 extending from the bottom wall 52. Between the first and second side walls 54, 56 are first and second opposing end walls 58, 60.

The first and second end walls 58, 60 also extend from the bottom wall 52. In the embodiment shown, the first and second side walls 54, 56 are longer than the end walls 58, 60. In some embodiments, the side walls 54, 56 are more than double, and at least three times the length of the end walls 58, 60. Of course, many shapes are possible, and this is just one example.

The container 46 includes the access opening 38, mentioned above. The access opening 38 is surrounded by a rim 62 defined by free ends of the first and second side walls 54, 56 and first and second end walls 58, 60.

The removable lid 48 covers the access opening 38. The lid 48 has an interior side 64 which is in communication with the interior volume 50 of the container 46. The lid 48 further has an opposite exterior side 66 facing away from the interior volume 50 of the container 46.

The lid 48 can have a lock tab 68 projecting from the exterior side 66 facing away from the interior volume 50 of the container 46. The lock tab 68 is constructed and arranged to engage or mate with the cover member 36 in the litter box 20. When the cover member 36 is lifted by engagement with the cam 42, the lid 48 is also lifted to expose the access opening 38 to allow for the deposit of used litter. This is described further below.

The container 46 and lid 48 each has a radially projecting flange 70, 72 with an open passage 74 (FIGS. 12 and 13) in between sized to receive a guide rail, which is part of the guide rail arrangement 44, in the litter box 20, when operably positioned therein. This feature is described further below.

The first and second end walls 56, 58 have features that interact with the litter box 20 to position the container 46 in the correct position to receive litter, as well as serve as an indication to the user that he has properly positioned the container 46. In this embodiment, the first and second end walls 58, 60 each has an outwardly projecting protuberance 76, 78 (FIG. 13) each sized to be received by an opening or recess 80, 82 (FIG. 5) in the litter box 20. Many embodiments are possible, and in this embodiment, each of the end walls 58, 60 has a recessed section 80, 82 that is radially inward of a remaining portion of the end wall 58, 60. Each of the recessed sections 80, 82 is adjacent to the bottom wall 52 of the container 46. Projecting from the recessed sections 80, 82 are the protuberances 76, 78. The protuberances 76, 78 are generally centered between the first and second side walls 54, 56. Many embodiments are possible.

Figure 10:
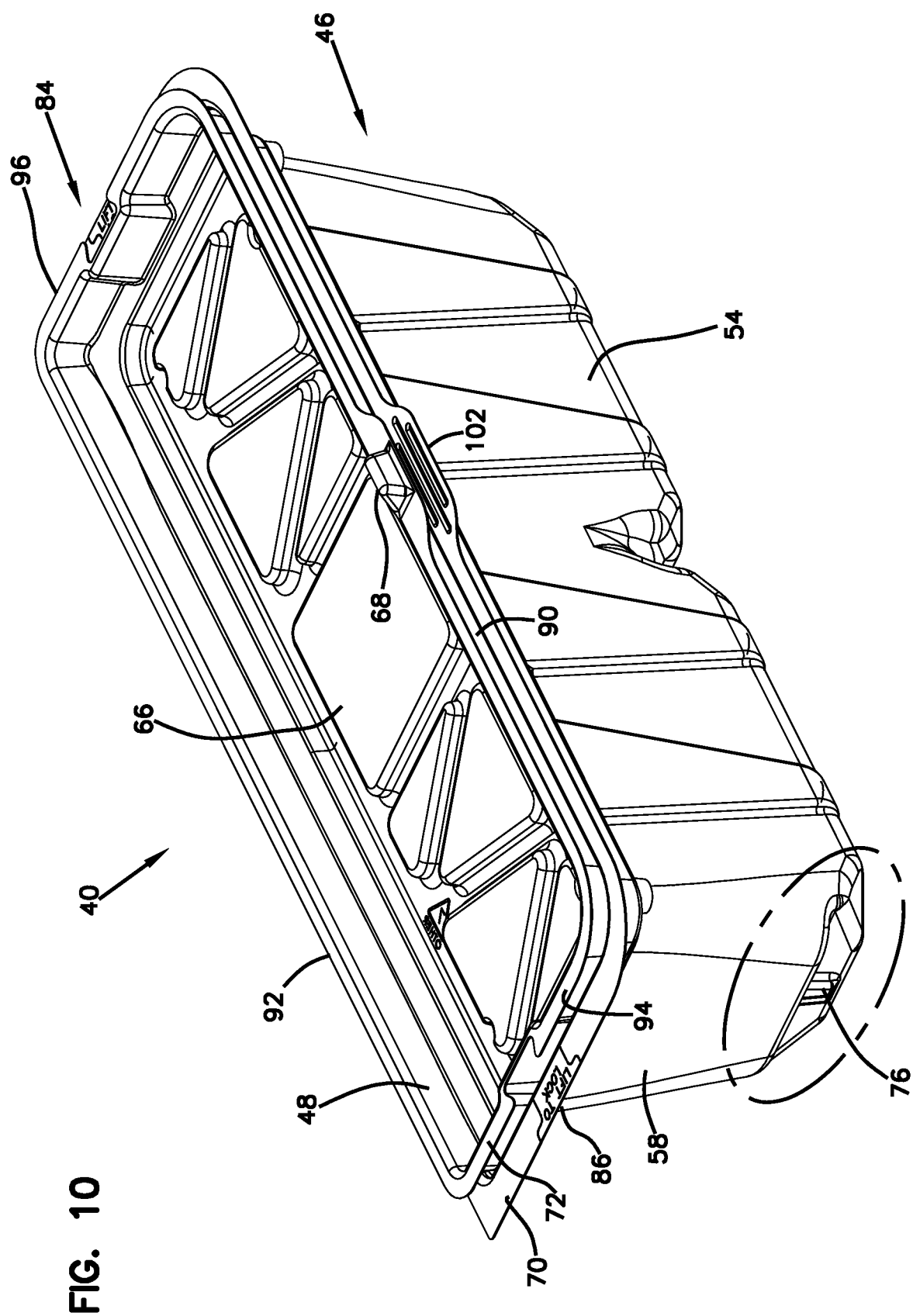
FIG. 10 is the receptacle of FIG. 9 assembled together.
Figure 11:
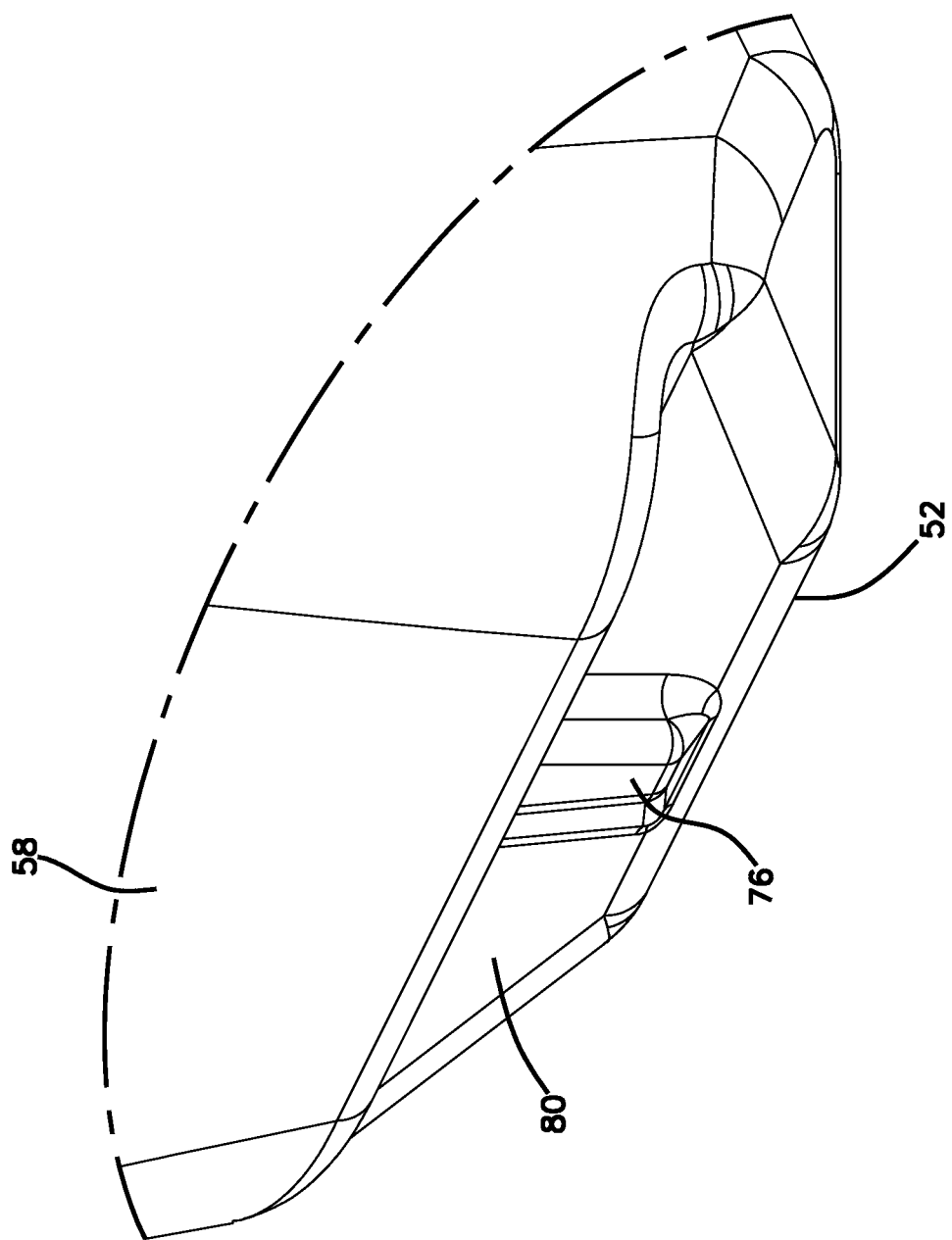
FIG. 11 is an enlarged view of a portion of the container shown in FIG. 10.
Figure 14:
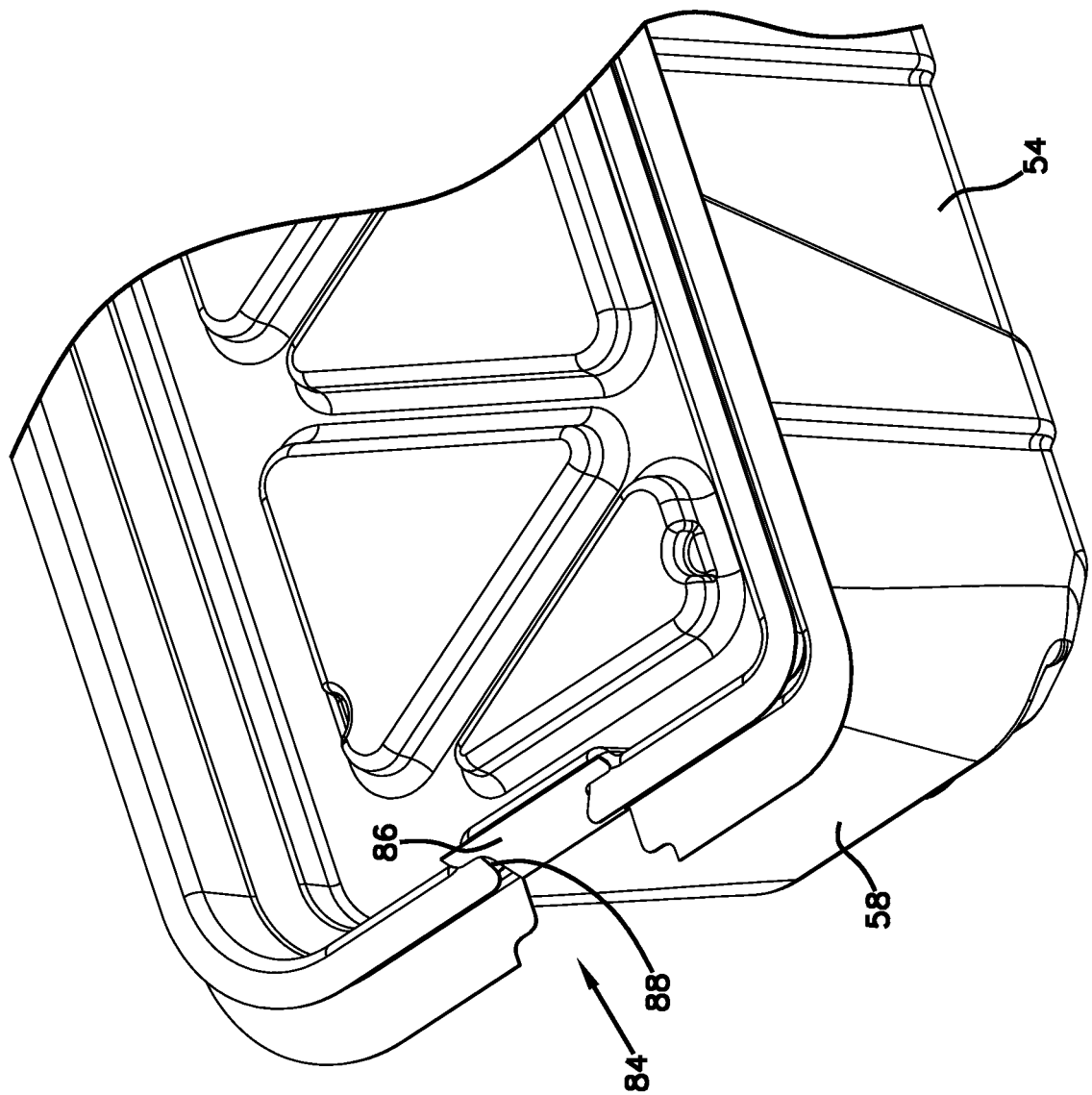
FIG. 14 is an enlarged, perspective view of a portion of the receptacle FIG. 10 and showing the container and lid fastened together.

The receptacle 40 may have a flap lock arrangement 84 (FIGS. 10 and 14). The flap lock arrangement 84 may be used to selectively secure the container 46 and lid 48 together. Many embodiments are possible. In the one shown, the flap lock arrangement 84 includes one or more foldable flaps 86 on one of the container 46 or lid 48, and one or more receivers 88 on the other of the container 46 or lid 48 to receive the one or more flaps 86. In this embodiment, the container 46 has at least two foldable flaps 86, 87, while the lid 48 has at least two receivers 88, 89 sized to receive the flaps 86, 87.

FIG. 10 shows the flap lock arrangement 84 in an unengaged or unconnected state, while FIG. 14 shows the flap lock arrangement 84 in an engaged or locked state. In general, when the user is ready to dispose of the litter receptacle 40, because it is full of used litter, for example, the user will engage the flap lock arrangement 84 by folding the flaps 86, 87 into the receivers 88, 89 to secure and lock the lid 48 to the container 46.

The flap lock arrangement 84 can be located in many different places. In the embodiment shown, the flaps 86, 87 are part of the flange 70 that extend from the end rails 58, 60.

The lid 48 has opposite first and second side edges and opposite first and second end edges 94, 96 extending between the first and second side edges 90, 92. The flanges 72 on the lid 48 extend radially from the first and second end edges 94, 96 of the lid 48. The receiver 88 is defined as part of the lid flange 72 along the first end edge 94, while the receiver 89 is defined by the lid flange 72 along the second end edge 96.

Figure 12:
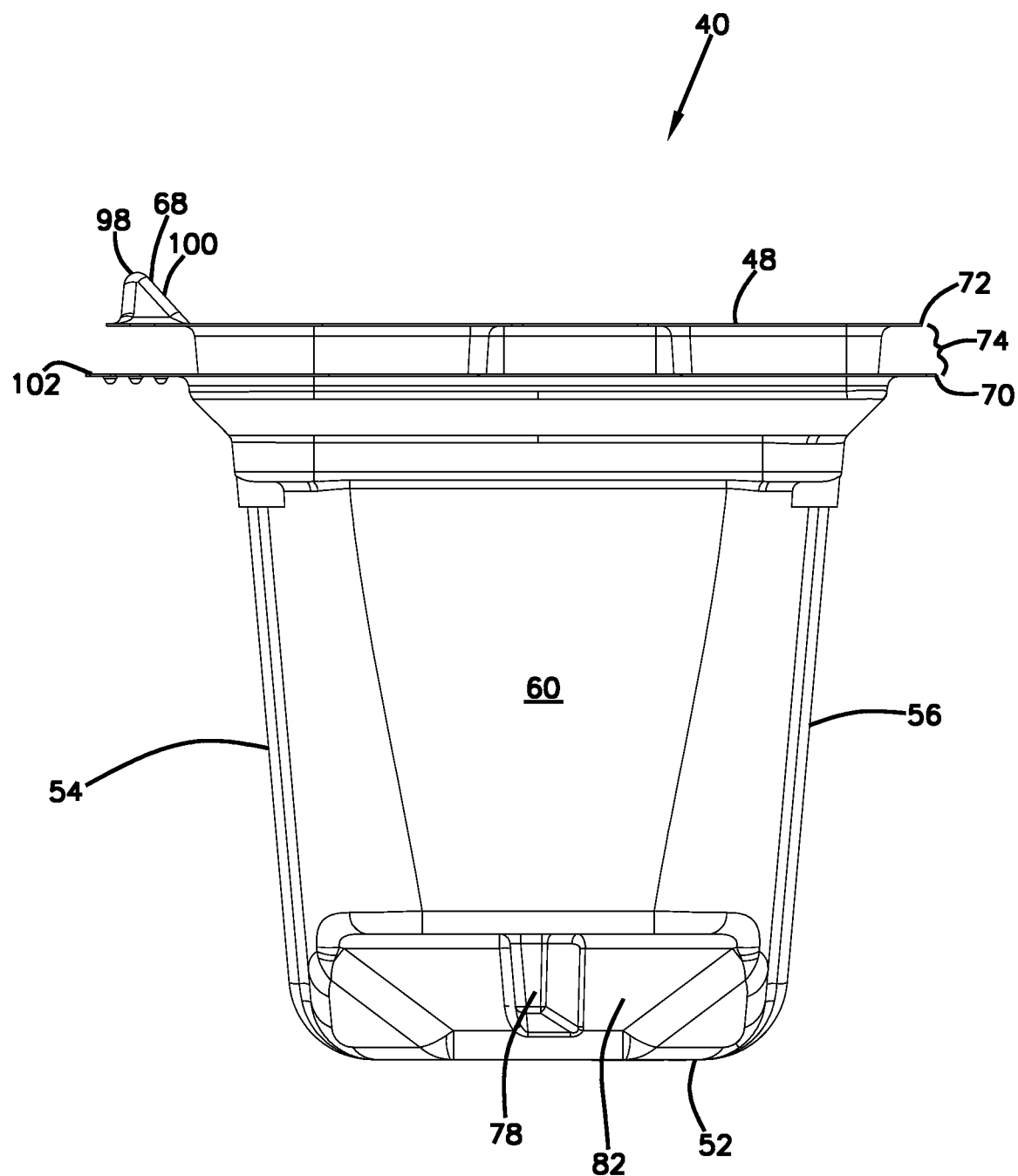
FIG. 12 is a side view of the assembled receptacle of FIG. 10.
Figure 13:
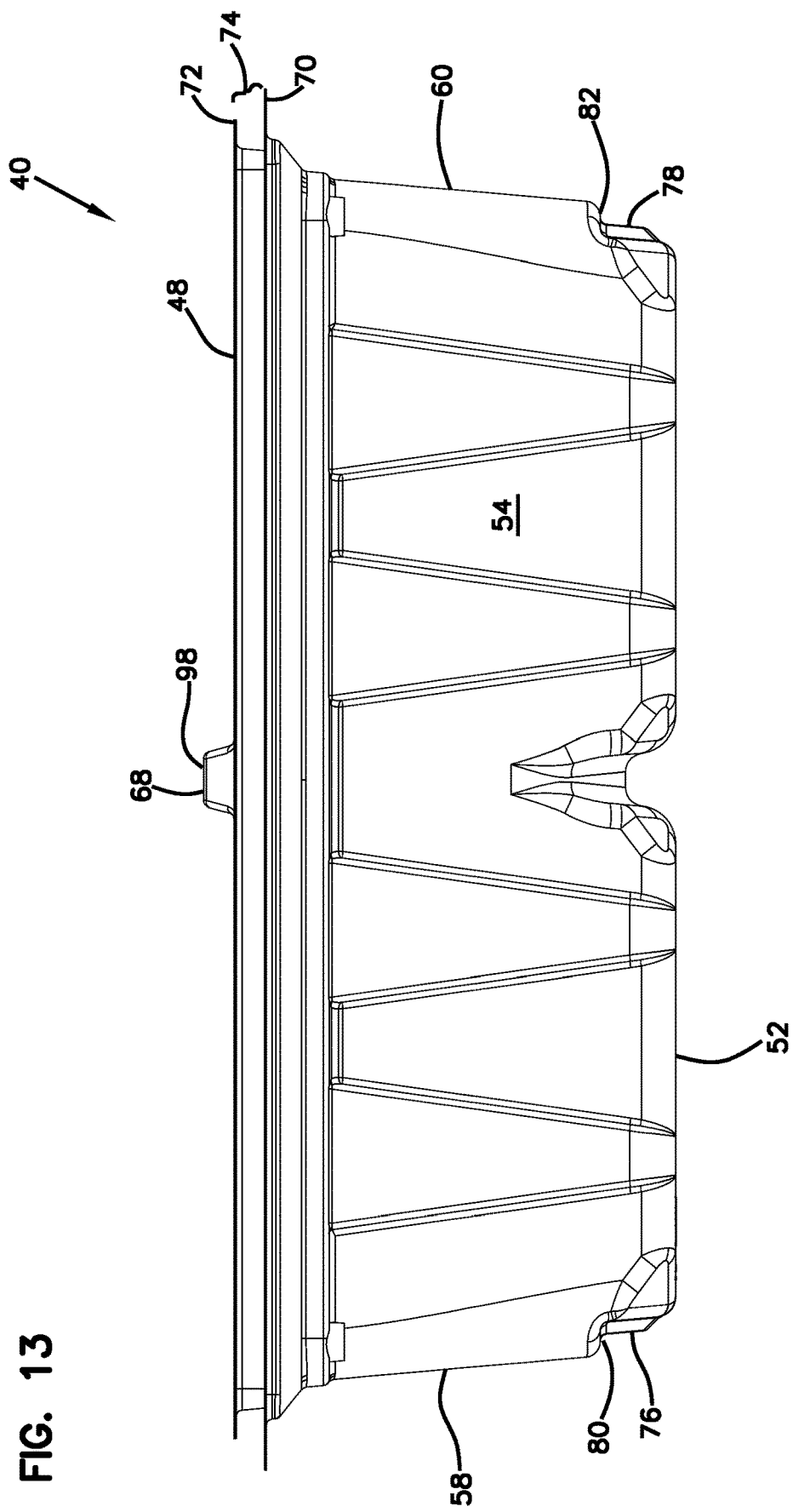
FIG. 13 is a front view of the assembled receptacle of FIG. 10.

In reference now to FIGS. 12 and 13, the lock tab 68 is described in further detail. The lock tab 68 has a free end 98, distal from a remaining portion of the lid 48. In FIG. 12, it can be seen how in this embodiment, the lock tab 68 further has a ramped surface 100 extending downward from the free end 98 and toward a remaining portion of the lid 48. While the lock tab 68 can be located in many different places, it is located so that it engages with the cover member 36. In this embodiment, the lock tab 68 is along one of the first and second side edges 90, 92. It is shown as being centered between the first and second end edges 94, 96. The lock tab 68 extends from the lid flange 72 along the first side edge, in the embodiment shown.

In FIG. 12, the lock tab 68 is shown as having a triangular cross-sectional profile. This can be helpful when engaging with the cover member 36.

The container 46 may further include a finger tab 102. The finger tab 102 extends radially outwardly from the rim 62 adjacent one of the first and second side walls 54, 56. In this embodiment, the finger tab 102 is also centered between the first and second end walls, 58, 60 of the container 46. The finger tab 102 is illustrated as being part of the container flange 70 and extending radially outwardly from a remaining portion of the flange 70 adjacent the first side wall 54. In the embodiment illustrated, the lock tab 68 of the lid 48 is oriented axially over or above the finger tab 102. Many embodiments are possible.

C. Guide Rail Arrangement & Other Container Engagement Features

As mentioned previously, the guide rail arrangement 44 is provided in the interior 41 of the box 22 to receive the litter receptacle 40. While many embodiments are possible, one example embodiment is illustrated in FIGS. 4, 6, and 7.

The guide rail arrangement 44 includes ribs or rails 104 radially projecting from an interior of the wall 24 of the box 22. In this embodiment, the rails 104 project from an interior facing surface 106 of a pair of cam followers 108, 110. The cam followers 108, 110 are coupled to the cover member 36 (FIG. 8) and are against the interior wall 24 of the box 22, with the cover member 36 bridging therebetween. The cam followers 108, 110 engage with and are pushed by the cam 42 to pivot the cover member 36 from a covering position to an open position providing access to the access opening 38 so that the rake 32 can deposit used litter through the access opening 38 and into the interior volume 50 of the container 46.

Figure 6:
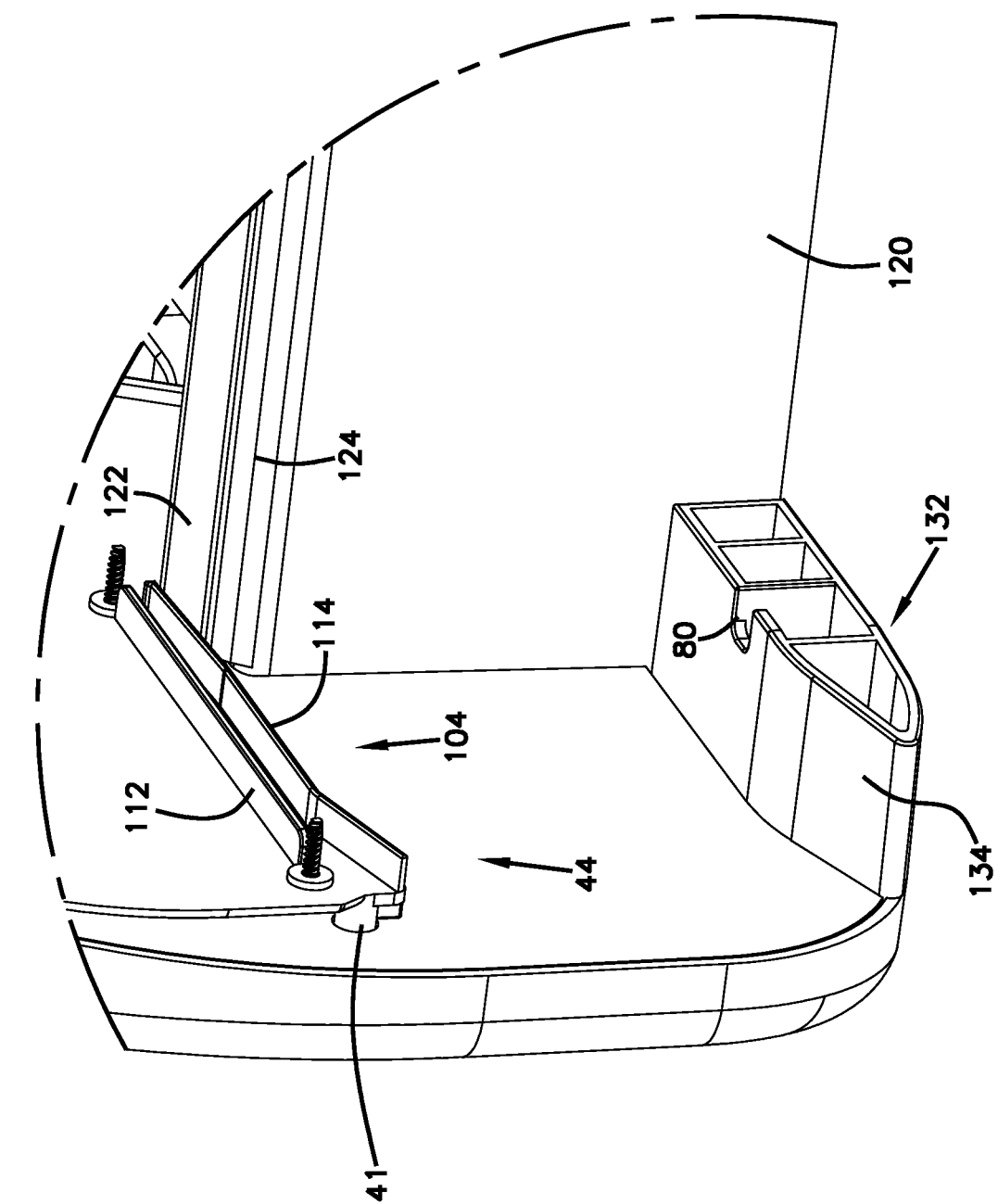
FIG. 6 is an enlarged view of the portion of the receptacle container compartment of FIG. 4.
Figure 7:
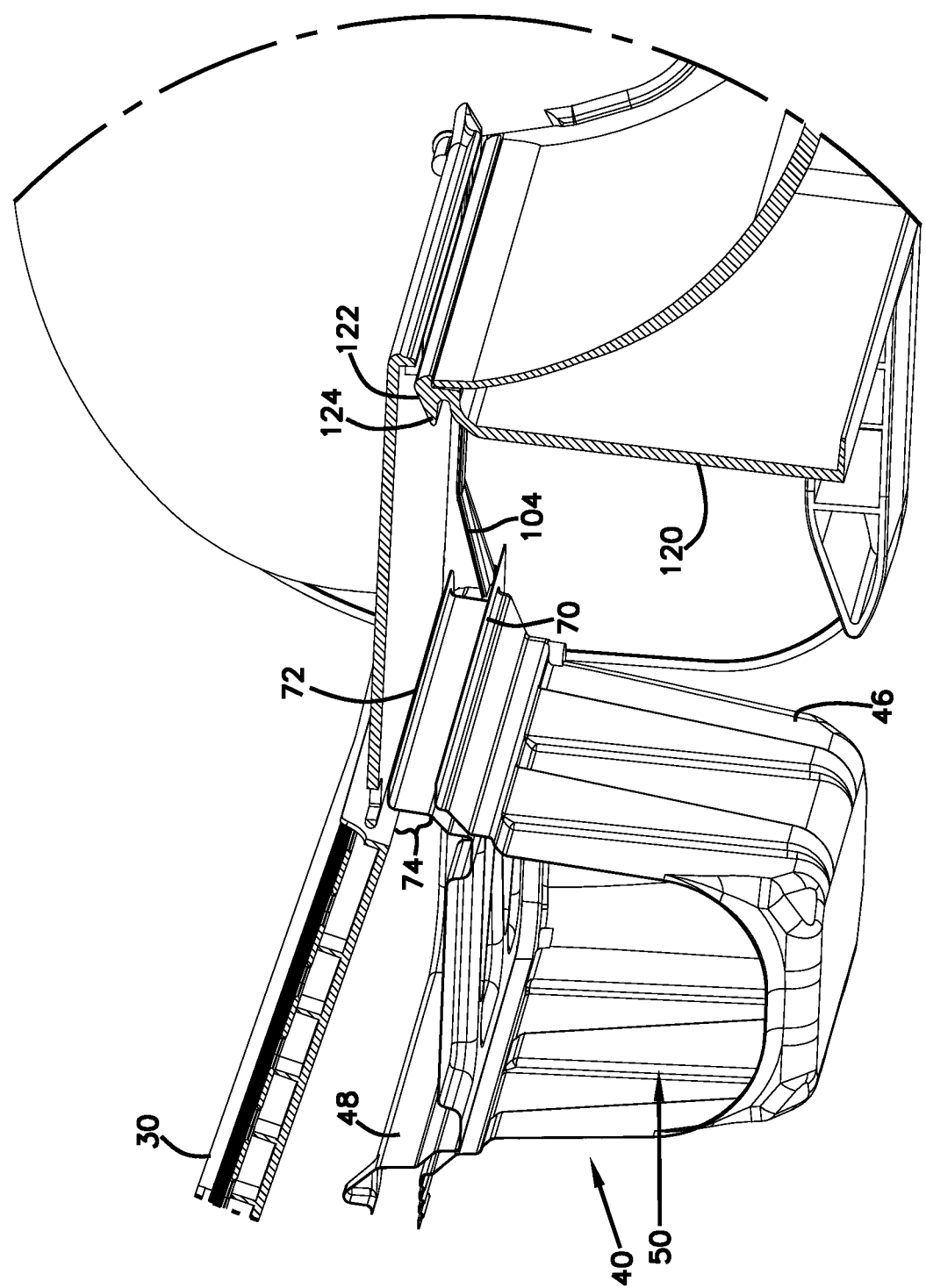
FIG. 7 is a perspective, cross-sectional view of a portion of the receptacle container compartment with a receptacle container being loaded therein.

In FIG. 6, the rails 104 can be seen as an upper slide rail 112 and a lower slide rail 114. The positioning of upper slide rail 112 and lower slide rail 114 are arranged so that the lid flange 72 rests between the upper slide rail 112 and lower slide rail 114, and the open passage 74 between the container flange 70 and lid flange 72 receives the lower slide rail 114 therein.

When the cover member 36 is in the resting position covering the access opening 38 (FIG. 1), the slide rails 112, 114 are generally horizontal and parallel to the floor 26 of the box 22. When the cover member 36 is pivoted about pivot point 41 to be in the open position uncovering the access opening 38, the slide rails 112, 114 are angled relative to a plane parallel to the floor 26 at an angle greater than 30° and usually at 90° or less.

FIG. 4 illustrates the guide rail arrangement 44 on the cam follower 108. It should be understood that the guide rail arrangement 44 on the cam follower 110 is identical in structure as that shown for the cam follower 108.

When the rake 32 is driven by the drive unit 34, it moves along the floor 26 of the box 22 from a first end 116 in a direction toward an opposite second end 118. As the rake drags along the floor 26 of the box 22, it captures clumped litter. Eventually, the cam 42 engages the cam followers 108, 110. As the rake 32 and cam 42 continues to move in a direction toward the second end 118, the cam 42 pushes on the cam followers 108, 110, which causes the cam followers 108, 110 to pivot about pivot point 41. As it does, the lid 48, which is captured between the slide rails 112, 114 also moves and pivots with the cover member 36. This exposes the access opening 38, which allows the rake 32 to push the clumped litter it has captured into the interior volume 50 of the container 46 (see FIG. 3).

The litter box 20 includes other features that engage or interact with the litter receptacle 40. For example, the surrounding wall 24 of the box 22 includes a front wall 120. The front wall 120 extends from the floor 26 and has a free end 122 opposite of the floor 26. The free end 122 has a lip 124. The lip 124 projects away from the interior 28 of the box and is positioned to hold the litter receptacle 40. In particular, the lip 124 engages against the rim 62 of the container 46 adjacent the second side wall 56. The lip 124 helps to hold the container 46 in place while the combination of the cover member 36 and lid 48 are pivoted away from the container 46.

Figure 8:
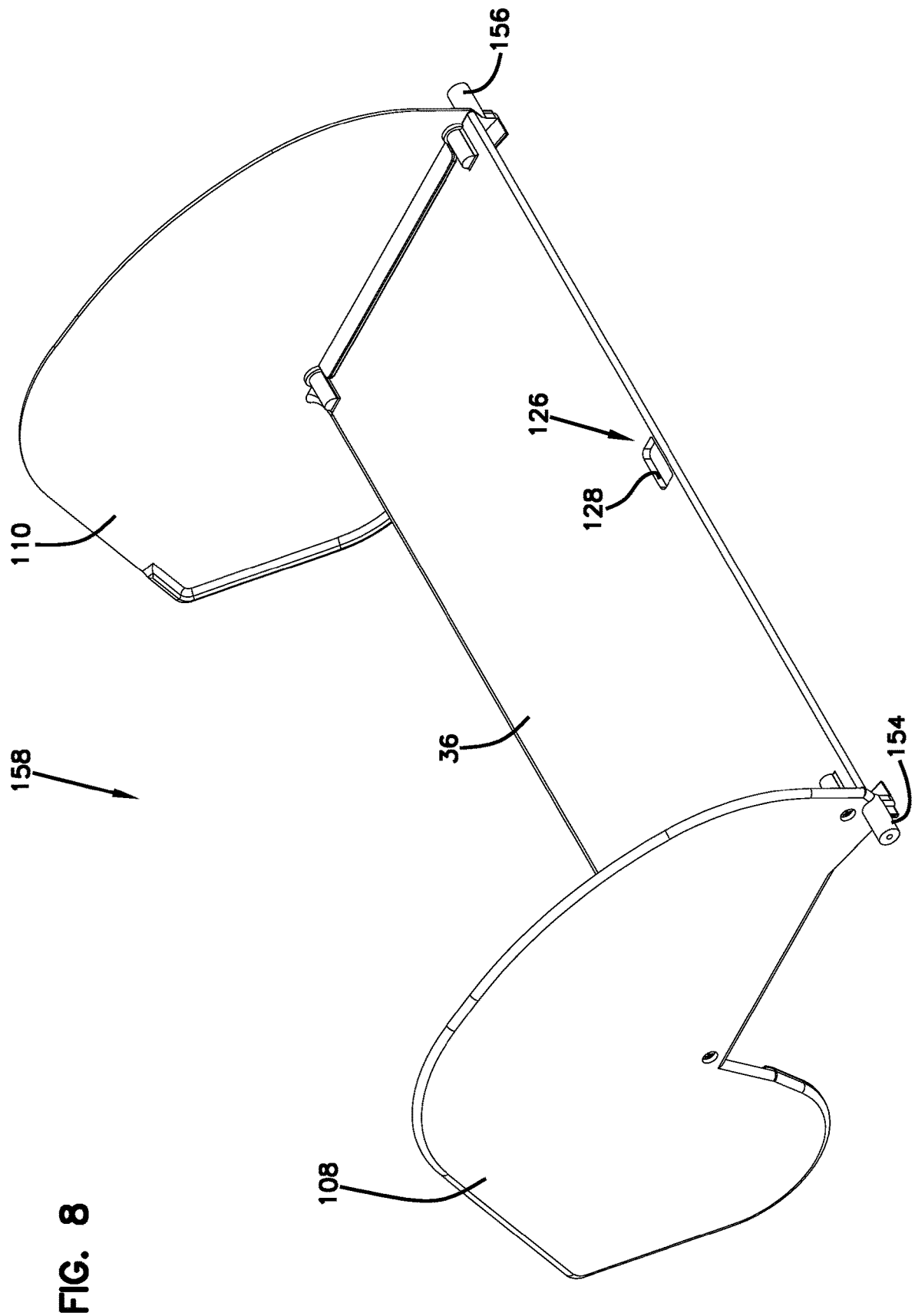
FIG. 8 is a perspective view of a cam follower and cover member used in the litter box of FIG. 1.
Figure 9:
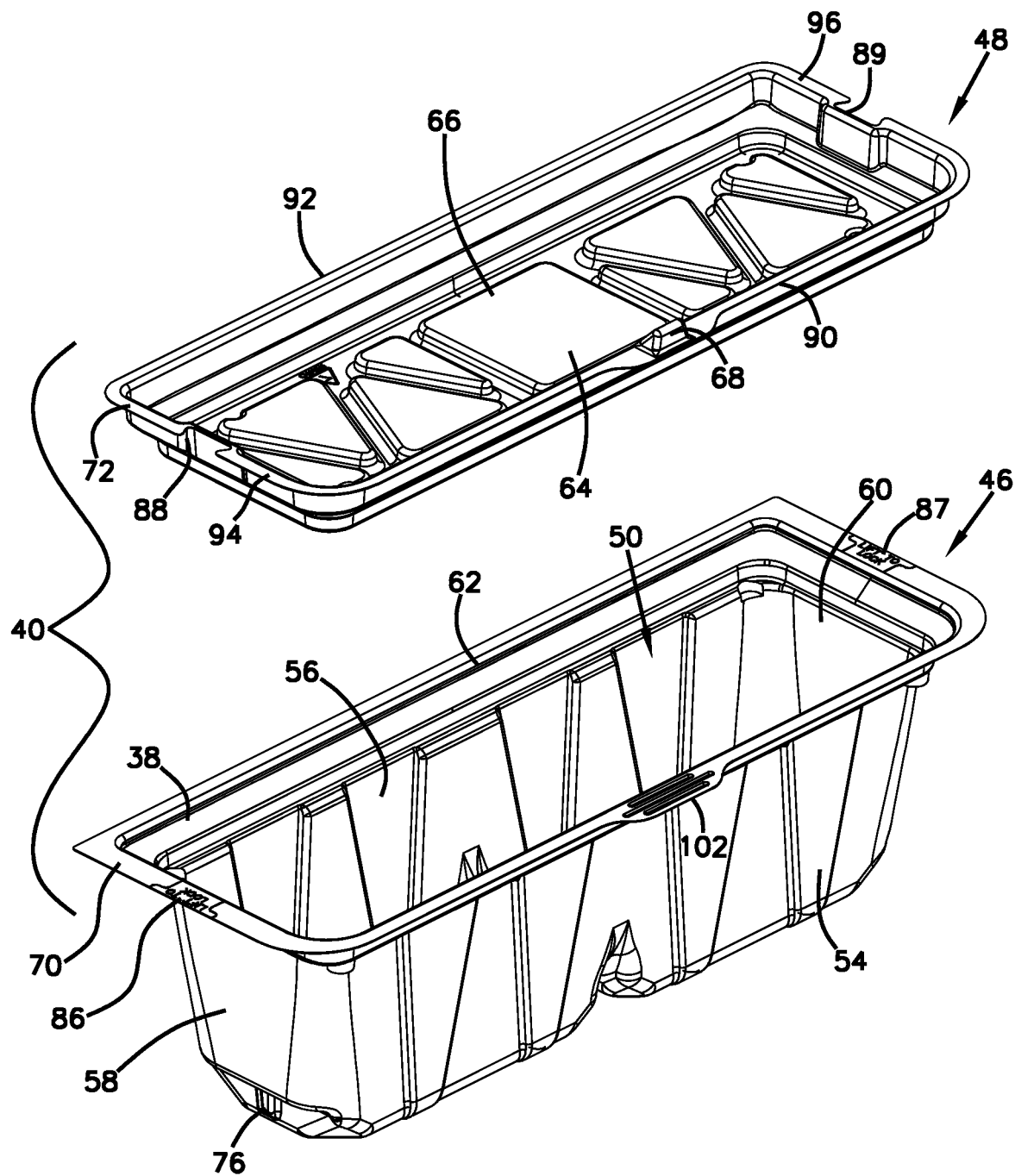
FIG. 9 is an exploded perspective view of a disposable receptacle including a container and removable lid usable with the litter box of FIG. 1.

Attention is directed to FIG. 8. The cover member 36 includes a fastener 126 for selectively removably securing to the lid 48 of the receptacle 40. In this embodiment, the fastener 126 includes an open aperture 128 sized to accommodate the lock tab 68 of the lid 48 of the receptacle 40. The aperture 128 is sized so that the ramped surface 100 of the lock tab 68 leads the lock tab 68 into the aperture 128 until there is snapped engagement between the aperture 128 and the lock tab 68. Many embodiments are possible.

Attention is again directed to FIGS. 4 and 5. The litter box 20 has a litter receptacle compartment 130. The litter receptacle compartment 130 is positioned on an opposite side of the front wall 120 from the box interior 28. The compartment 130 is for removably holding the litter receptacle 40 therein.

The litter receptacle compartment 130 has a base arrangement 132. The base arrangement 132 has openings in the form of recessed sections 80, 82 that are sized to removably receive the projecting protuberances 76, 78 of the container 46 of the litter receptacle 40. In this embodiment, the base arrangement 132 includes a pair of slanted slide surfaces 134, 136 extending from whatever surface the litter box 20 is resting upon upward and in a direction toward the front wall 120. The slide surfaces 134, 136 help to guide the container 46 of the litter receptacle 40 into the proper place within the compartment 130. When the protuberances 76, 78 drop within the recessed sections 80, 82, the rim 62 is under the lip 124, and the lid flange 72 is between the slide rails 112, 114, so that the receptacle 40 is in place to receive used clumps of litter.

D. Additional Features

The litter box 20 can further include an optional ramp 30. The ramp 30 is movable, such that it can be pivoted in a direction from the position shown in FIGS. 1 and 3 upward to a position shown in FIG. 7. The ramp 30 extends from the box 22 to a surface, such as the ground or floor, outside of the box 22.

Figure 15:
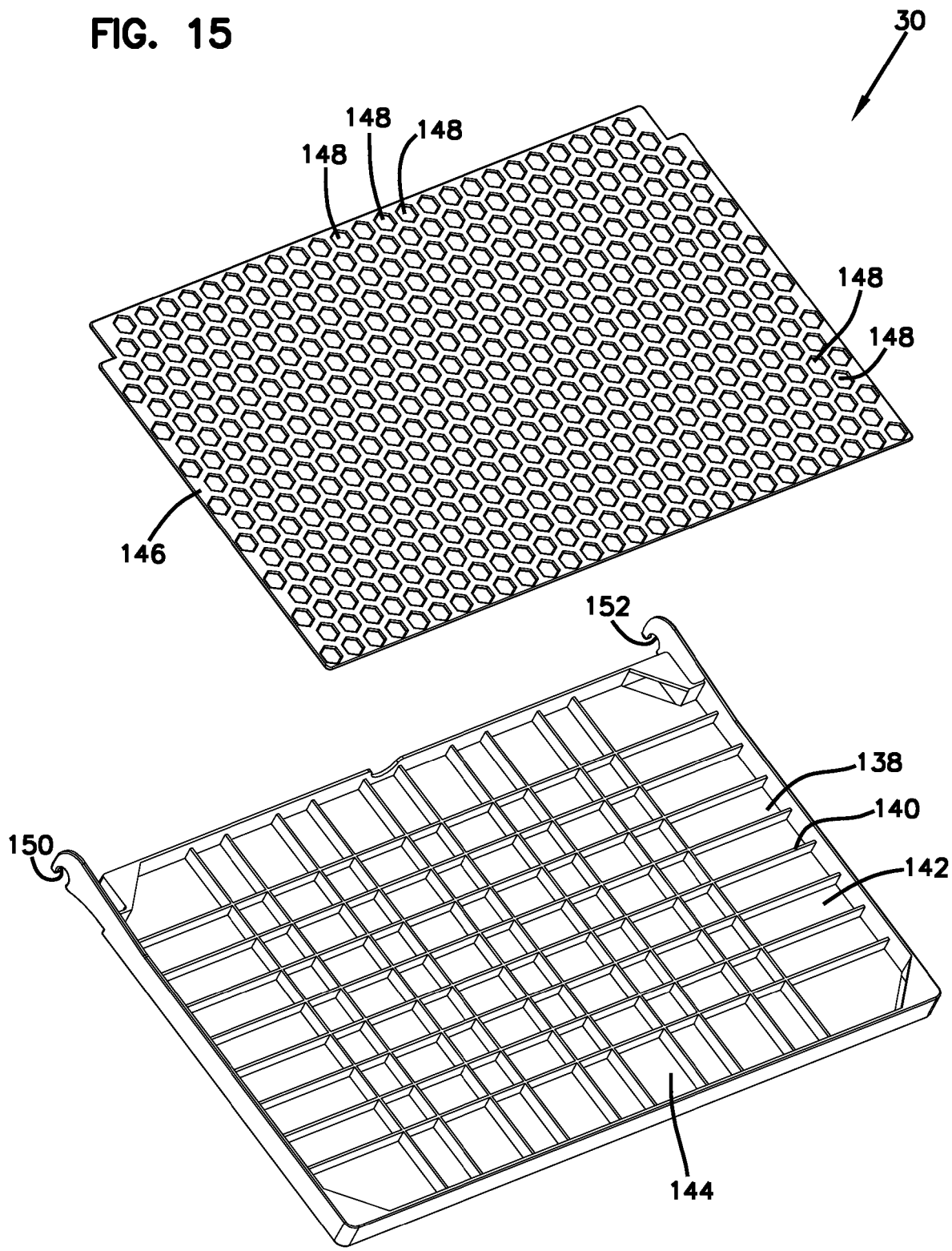
FIG. 15 is an exploded perspective view of the walking ramp used with the litter box of FIG. 1.

Attention is directed to FIG. 15. FIG. 15 shows one embodiment of an exploded view of a ramp 30 usable with the litter box 20. The ramp 30 includes a base surface 138 having a plurality of ribs or walls 140 extending from the base surface 138 to form a catch basin 142. While many embodiments are possible in this embodiment, the walls 140 are in a grid pattern, and a catch basin 142 is made up of a plurality of rectangular containers 144 between the walls 140. The catch basin 142 will trap litter particles that fall from the animal's paws, as the animal walks along the ramp 30.

A porous mat 146 rests on the walls 140 to cover the catch basin 142. The mat 146 can be made of a material to help loosen and attract litter particles that are on the animal's paws. The holes 148 within the mat 146 allow the litter particles to fall through the mat 146 and into the catch basin 142.

Figure 2:
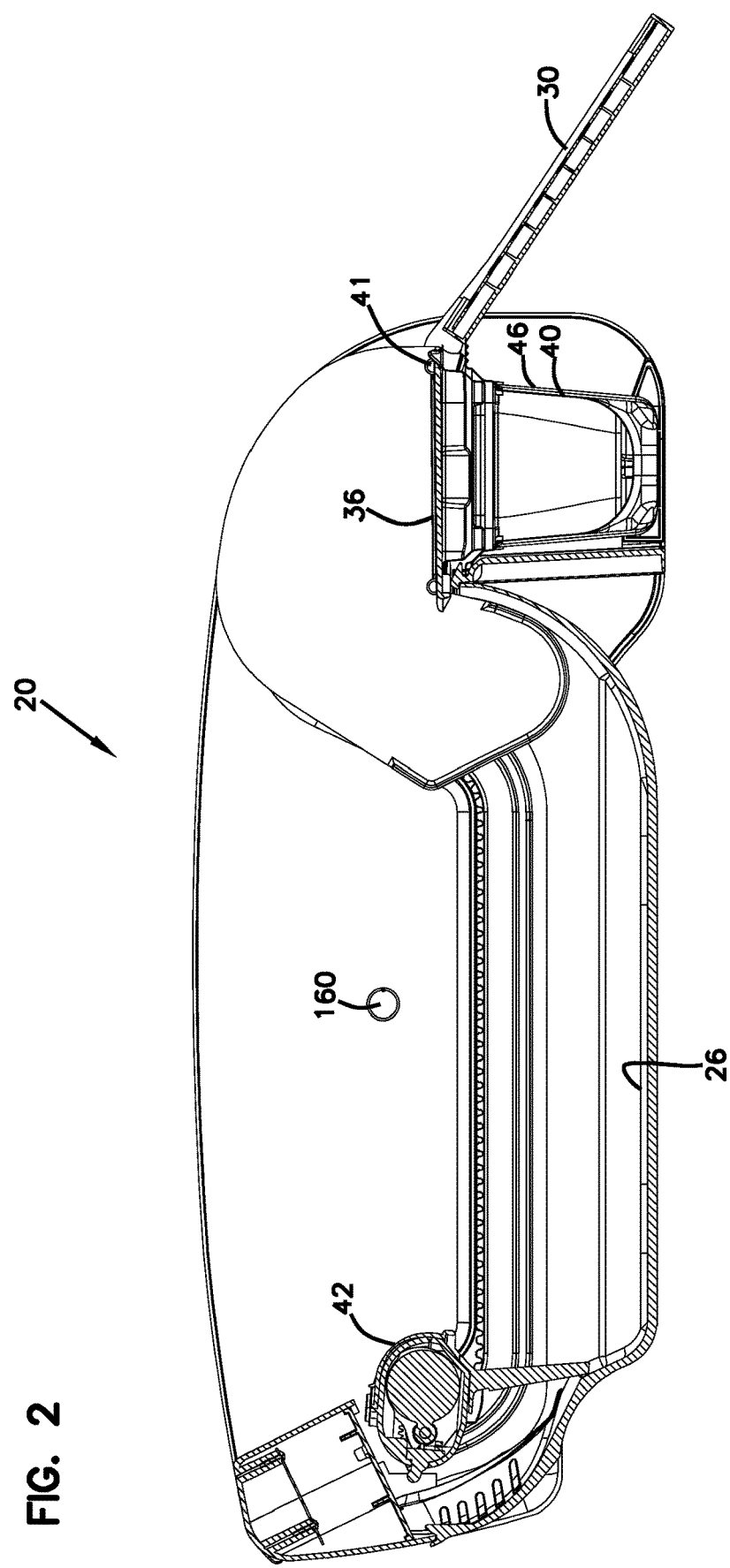
FIG. 2 is a cross-sectional view of the litter box of FIG. 1.

The ramp 30 is removable relative to the box 22. In the example shown, one of the free ends of the ramp 30 has a pair of hooks 150, 152, which engage or latch on to the surrounding wall 24 of the box 22. As can be seen in FIGS. 1 and 2, the ramp 30 extends from adjacent the pivot point 41 next to the cover member 36 downward and away from the cover member 36 to the ground or floor upon which the litter box 20 is resting.

In FIG. 8, it can be noted how the cam followers 108, 110 each has a pivot pin 154, 156 extending in a direction away from the box interior 28 so that it is received by a hole in the side wall 24 of the box 22. The pins 154, 156 allow the cam and cover member assembly 158 to pivot relative to the rest of the box 22, when the cam 42 pushes on the cam followers 108, 110. The cover member 36 bridges between and secures the cam followers 108, 110. The open aperture 128 is generally centered between the cam followers 108, 110.

The litter box 20 includes a pair of sensors 160, 162 (FIG. 5) for sensing the presence of an animal, such as a cat. When the sensor 160, 162 is activated, after the sensors detect that the animal is no longer present within the interior 28 of the box 22, the self-cleaning feature is activated, as described in U.S. 8,156,895, incorporated herein by reference. This way, the cleaning features is not activated while the animal is still within the box interior 28.

In FIGS. 1 and 4, a handle 164 is visible. The handle 164 allows the user to lift the upper assembly comprising the surrounding wall 24 away from the floor 26, for convenient access and occasional deep cleaning. The opposite side of the box 22 in FIGS. 1 and 4 also has an identical handle.

The litter box 20 further includes a rocker switch 166. The rocker switch 166 has three positions, including on, clean, and off. In the on position, the litter box 20 is in the mode of automated cleaning, and will clean the box after detecting an animal has been in the box and has left the box. In the off position, no power is being delivered to the litter box 20, and no cleaning takes place. When switched to the clean position, the clean mode is activated, and the rake 32 moves from the first end 116, along the floor 26, and in a direction to the second end 118. Rake 32 pauses at second end 118 for cleaning of the rake tines or rake removal for cleaning. The rake 32 will return to home position after a 5 minute pause or when the 3-way toggle switch is toggled from cleaning mode to the on position.

Figure 16:
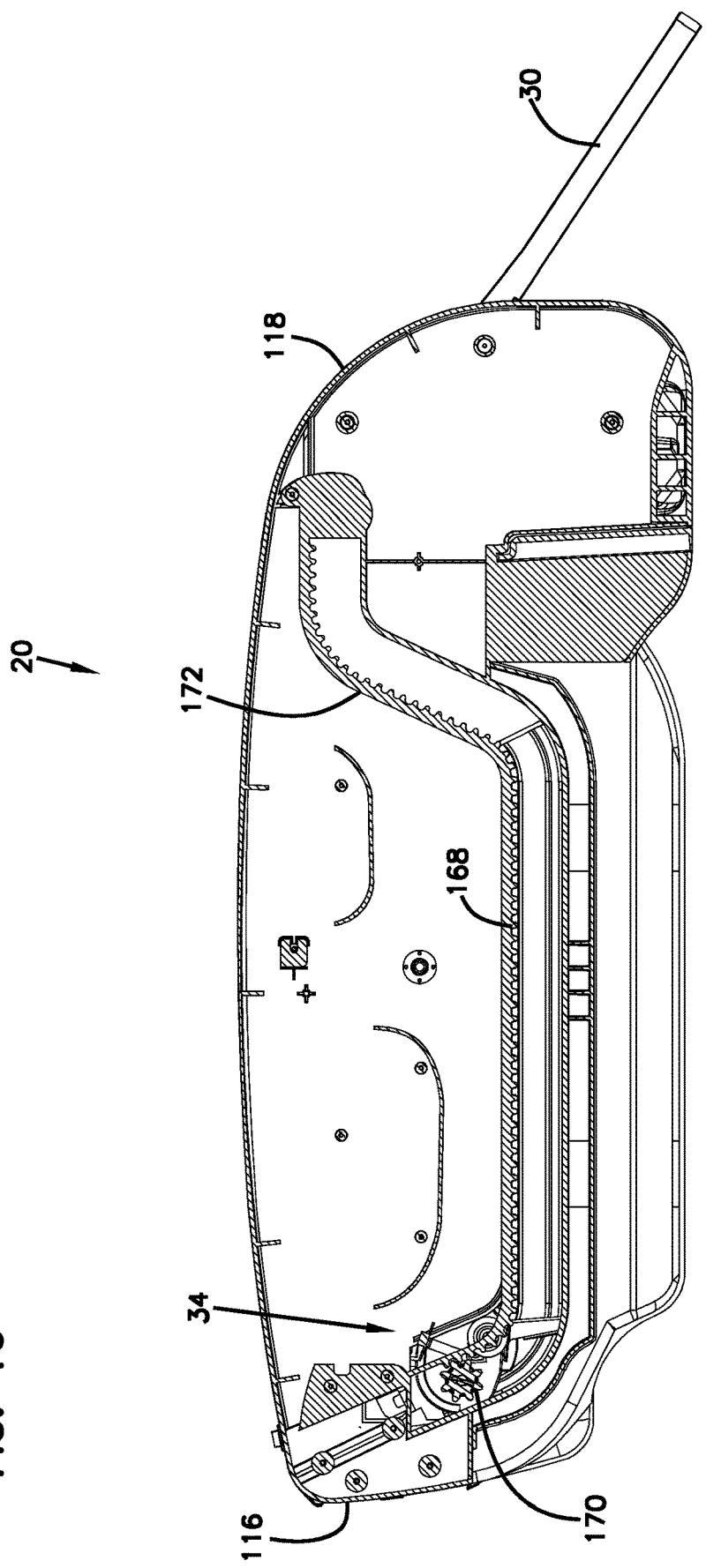
FIG. 16 is a schematic, cross sectional view of the litter box of FIG. 1, depicting the drive unit mechanism.

FIG. 16 illustrates a schematic view of the motor carriage of the drive unit 34. A magnetic read switch will control travel of the rake 32 and communicate with a magnet mounted to the motor carriage. In FIG. 16, it can be seen how the drive track 168 is driven by gear assembly 170. The rake 32 moves along the drive track 168 so that the tines of the rake 132 move through the litter and the ends of the tines move against the floor 26. As the rake 32 approaches the second end, the access opening 38 is exposed by moving the cover member 36 and lid 48 to the open position, previously described, and the tines of the rake holding the clumped litter move along the upward section 172 until reaching the end position (FIG. 3), which dumps the collected clumped litter from the rake 32 into the interior volume 50 of the container 46 of the litter receptacle 40. The drive unit 34 then reverses to return the rake 32 from the second end 118 to the first end 116. As it reverses direction, the cover member 36 and lid 48 are returned to a position covering the access opening 38 of the litter receptacle 40.

The litter box 20 may further include LEDs along a bottom edge for illuminating the box 22. There may also be a light sensor for adjusting the lights into a dimmer night light mode.

E. Optional Scoop Feature

Figure 17:
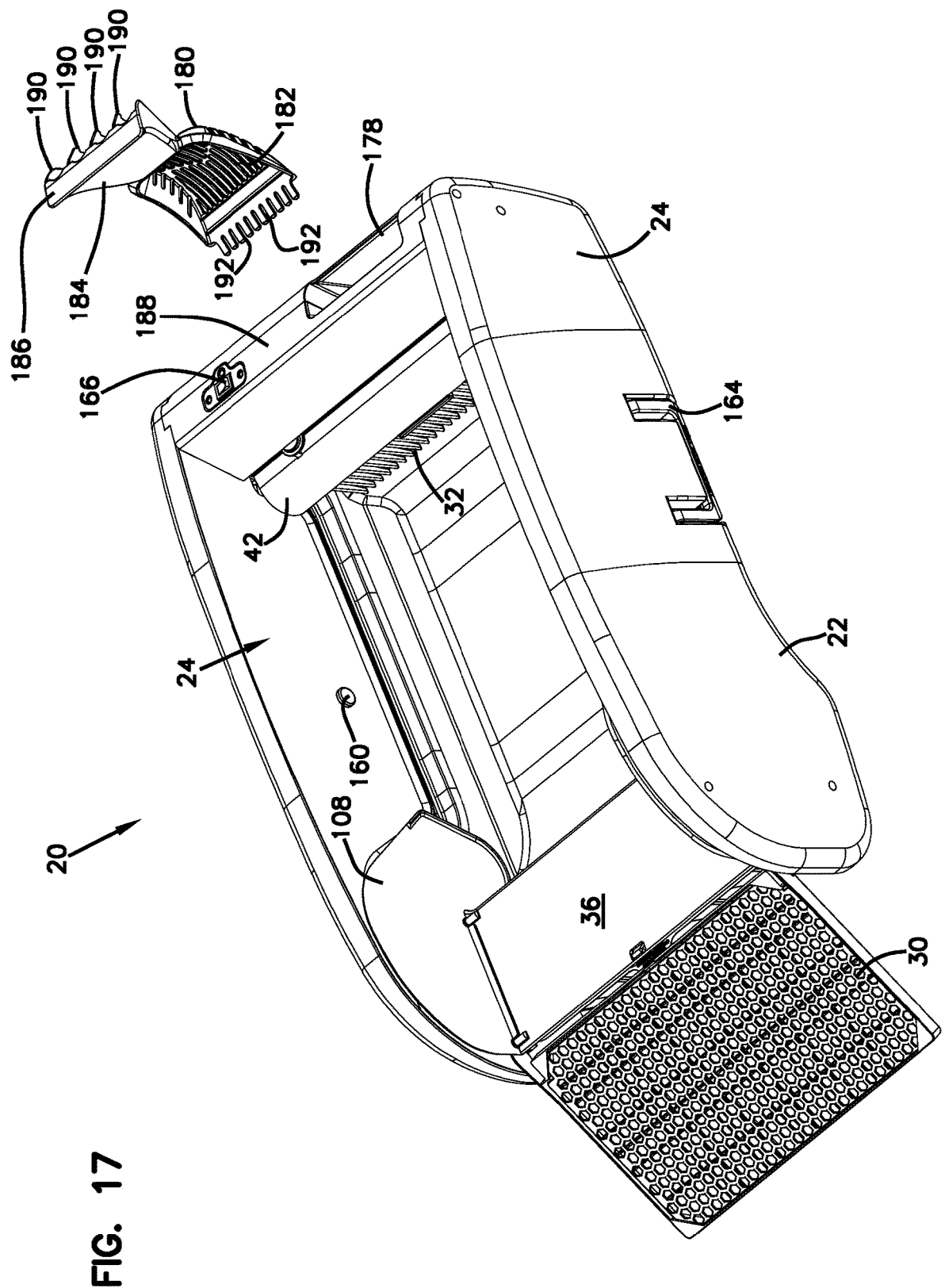
FIG. 17 is a perspective view of the automated self-cleaning litter box of FIG. 1 and an optional built-in scoop holder and scoop.
Figure 18:
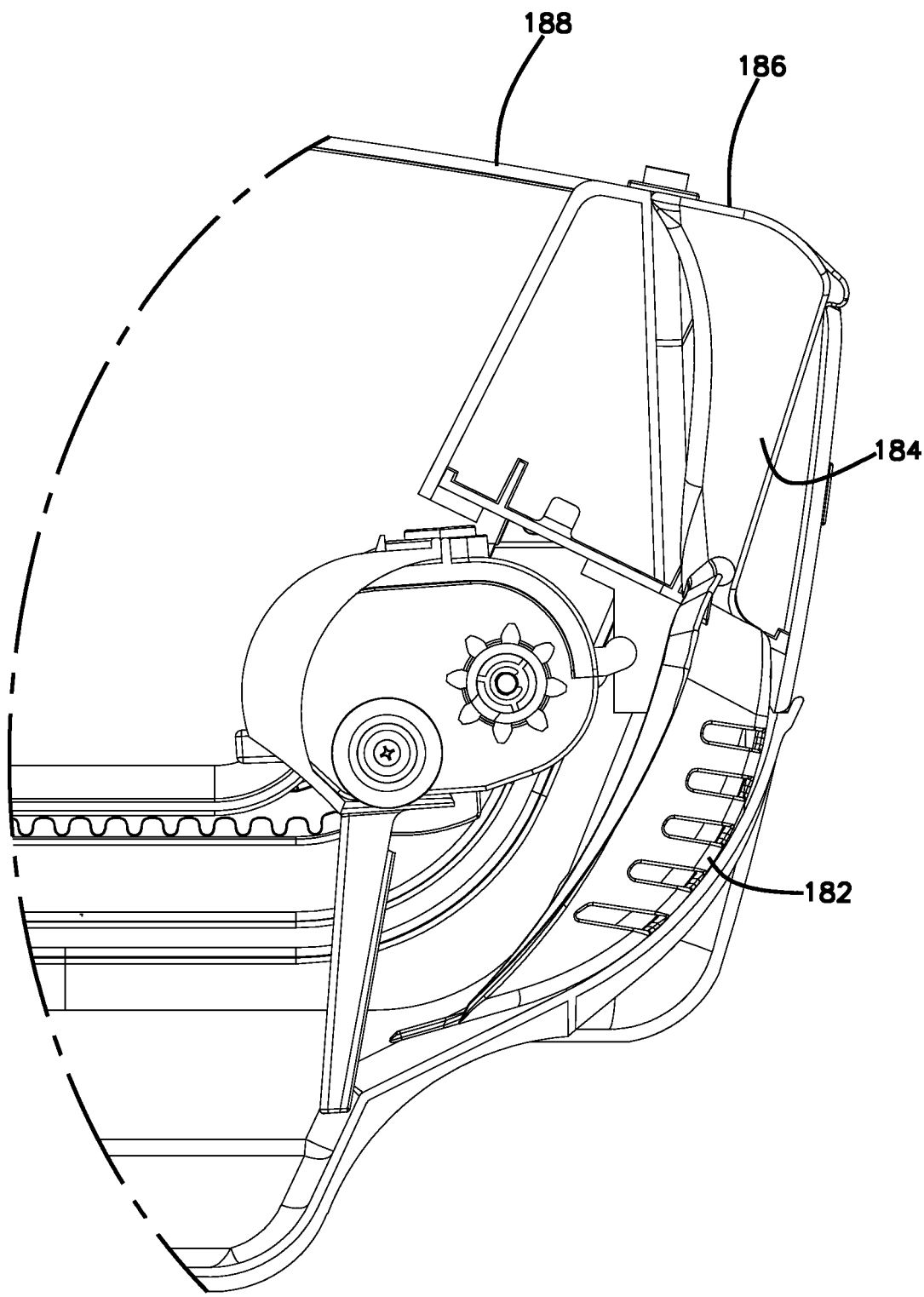
FIG. 18 is an enlarged cross-sectional view of the litter box of claim 17 showing the scoop situated in the storage holder or pocket of the litter box.
Figure 19:
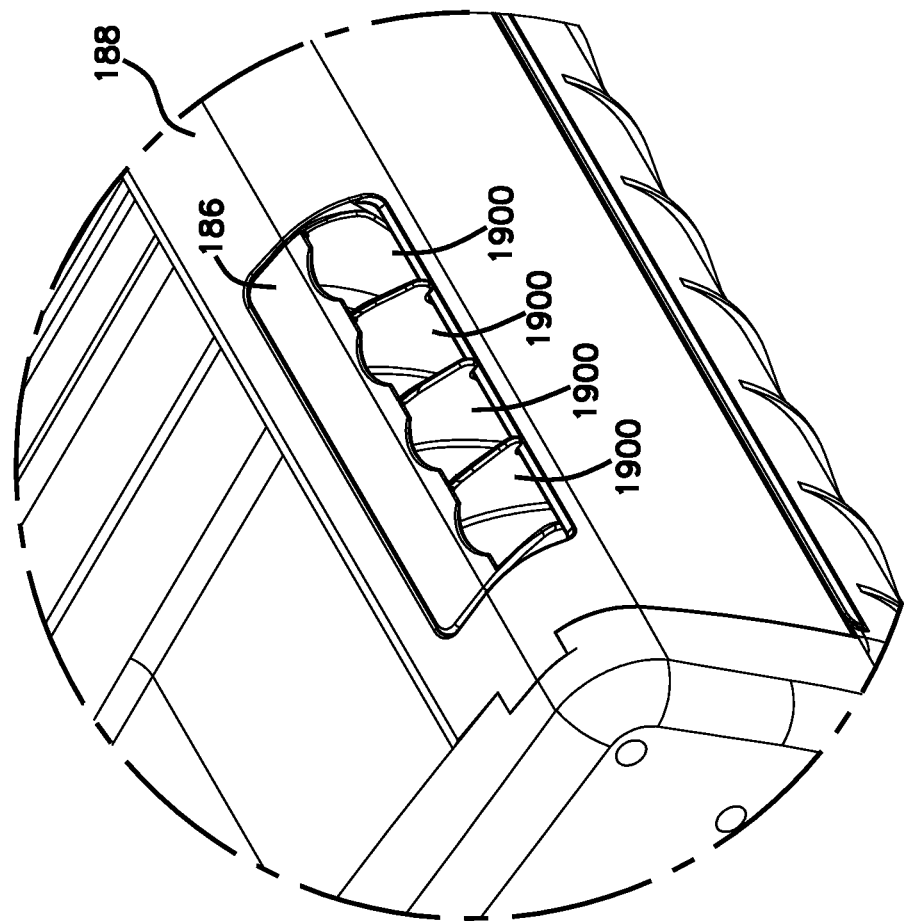
FIG. 19 is an enlarged perspective view of the portion of FIG. 18 showing exposed finger grips on the scoop for removal from the litter box.

Attention is directed to FIGS. 17-19. The litter box 20 can further include a storage pocket 178 within the surrounding wall 24 sized to receive a removable litter scoop 180.

The scoop 180 includes a sieve section 182 and a handle section 184. When the scoop 180 is positioned within the storage pocket 178, a top 186 of the scoop 180 along the handle section 184 is flush with a top surface 188 of the surrounding wall 24.

The top 186 of the scoop 180 can further have finger grips 190 that are accessible to a user, when the scoop 180 is positioned within the storage pocket 178.

The scoop 180 can further include a plurality of tines 192 extending at a free end from the sieve section 182. The tines 192 can be used to scrape against the floor 126 to help loosen any clumped litter that is stuck to the floor 26. The tines 192 can be at a pre-selected length to help the user measure how much litter to put into the box 22 by matching the litter height in the box 22 to the length of the tines 192

The tines 192 of the scoop 180 are also useable to clean the rake 32.

F. Example Operation

In operation, a method of positioning the disposable litter receptacle 40 having container 46 and lid 48 into the automated self-cleaning litter box 20 is provided. The method includes sliding the receptacle 40 (container 46 and lid 48 together) so that: (i) the bottom wall 52 of the container is against the bottom base arrangement 132; (ii) the container flange 70 is against a lower side of slide rail 114; and (iii) the lid flange 72 is between upper slide rail 112 and lower slide rail 114; until protuberances 76, 78 extending from the container 46 are received within recesses 80, 82 in the bottom base arrangement 132. This step includes having the lower slide rail 114 be received within the open passage 74 between the flanges 70, 72. The lid flange 72 will be between the upper slide rail 112 and lower slide rail 114.

After the container 46 and lid 48 are positioned in the compartment 130, the lid 48 is removably attached to the cover member 36. In one example, this is done by positioning the lock tab 68 into the open aperture 128 of the cover member 36. This can be done by snap engagement between the lock tab 68 and the open aperture 128.

The method may further include positioning the rim 62 of the second side wall 56 of the container 46 against the upper lip 124 at a free end 122 of the front wall 120 of the litter box 22.

After an animal has used the litter box 20, the sensors 160, 162 will indicate, after a period of time after the animal has exited the litter box 20, when to activate the cleaning mode. When the cleaning mode is activated, the rake 32 moves from the first end 116 in a direction to the second end 118, dragging the ends of the rake 32 along the floor 26 of the box 22. The cam 42 will engage against the cam followers 108, 110, which will pivot the cam followers 108, 110 relative to a remaining portion of the box 22 about the pivot point 41. This will pivot the cover member 36, which will also move the lid 48 away from the container 46 to expose the access opening 38. The rake 32 will then dump the clumped litter collected between the tines of the rake 32 into the interior volume 50 of the container 46. The rake 32 will then return to the initial position adjacent the first end 116, which allows the cover member 36 to pivot back into a position covering the access opening 38 of the container 46.

To change litter receptacles 40, when the container 46 becomes full, the user will pivot the ramp 30 upwardly, and then release the connection between the cover member 36 and the lid 48. The container 46 and lid 48 are removed from the compartment 130. The user may then attach or secure the lid 48 to the container 46 by engaging the flap lock arrangement 84. This filled litter receptacle 40 is then disposed of and replaced with a new empty litter receptacle 40. The new litter receptacle 40 is installed in the compartment 130, as described above.

The above represents example principles. Many embodiments can be made using these principles.

What is claimed is:

1. An automated self-cleaning litter box for automatically disposing of used litter into a disposable receptacle; the litter box comprising:
    (a) an open topped box with a floor and a surrounding wall defining an interior sized to be accessible by an animal and for holding litter;
    (b) a motorized drive unit coupled to the box;
    (c) a rake driven by the drive unit within the box interior; the rake having a cam secured thereto;
    (d) first and second cam followers pivotably secured to the box;
    (e) a movable cover member constructed and arranged to cover and expose an opening of a litter receptacle; the cover member being movable responsive to engagement by the cam, and the cover member being coupled to the first and second cam followers; and
    (f) wherein the first cam follower has an interior facing surface with a first set of an upper slide rail and a lower slide rail spaced apart from each other and projecting from the interior facing surface of the first cam follower and positioned to receive at least a first portion of the litter receptacle; and the second cam follower also has an interior facing surface with a second set of an upper slide rail and lower slide rail spaced apart from each other and projecting from the second cam follower interior facing surface and positioned to receive at least a second portion of the litter receptacle.

2. The litter box of claim 1 wherein the cover member has a fastener for selectively removably securing to a lid of the receptacle.

3. The litter box of claim 2 wherein the fastener on the cover member comprises an open aperture sized to accommodate a lock tab of the lid of the receptacle.

4. The litter box of claim 1 wherein the surrounding wall of the box includes a front wall extending from the floor; the front wall having a free end with a lip projecting away from the interior of the box and positioned to hold the litter receptacle.

5. The litter box of claim 4 wherein the box defines a litter receptacle compartment positioned on an opposite side of the front wall from the box interior; the litter receptacle compartment having a base arrangement with openings sized to removably receive projecting protuberances of the litter receptacle.

6. The litter box of claim 5 wherein the base arrangement of the litter receptacle compartment includes a pair of slanted slide surfaces to guide the litter receptacle into place in the compartment.

7. The litter box of claim 1 further including:
    (a) a walking ramp removably extending from the box to a surface outside of the box.

8. The litter box of claim 7 wherein the walking ramp comprises:
    (a) a base surface and plurality of walls extending from the base surface to form a catch basin; and
    (b) a porous mat removably covering the catch basin.

9. The litter box of claim 1 wherein the surrounding wall includes a storage pocket sized to receive a removable scoop.

10. The litter box of claim 9 further including a removable scoop positioned in the storage pocket, the scoop having a sieve section and a handle section; a top of the scoop along a free end of the handle section being flush with a top surface of the surrounding wall.

11. The litter box of claim 10 wherein the top of the scoop has finger grips that are accessible to a user when the scoop is positioned in the storage pocket.

12. The litter box of claim 1, wherein the cover member is movable between a resting position and an open position; and wherein when the cover member is in the resting position, the first set and second set of upper and lower slide rails are horizontal and parallel to the floor of the box; and when the cover member is in the open position, the first set and second set of upper and lower slide rails are angled relative to a plane parallel to the floor at an angle greater than 30°.

13. An automated self-cleaning litter box for automatically disposing of used litter into a disposable litter receptacle; the litter box comprising:
    (a) an open topped box with a floor and a surrounding wall defining an interior sized to be accessible by an animal and for holding litter;
        (i) the surrounding wall of the box including a front wall extending from the floor;
        (ii) the box defining a litter receptacle compartment positioned on an opposite side of the front wall from the box interior;
    (b) an upper slide rail and a lower slide rail projecting in the interior of the box constructed and arranged to slidably receive at least a portion of the litter receptacle into the litter receptacle compartment;
    (c) a motorized drive unit couple to the box;
    (d) a rake driven by the drive unit within the box interior; the rake having a cam secured thereto; and
    (e) a movable cover member constructed and arranged to cover and expose an opening of a litter receptacle; the cover member being movable responsive to engagement by the cam.

14. The litter box of claim 13 wherein the front wall has a free end with a lip projecting away from the interior of the box and positioned to hold the litter receptacle.

15. The litter box of claim 13 wherein the litter receptacle compartment has a base arrangement with openings sized to removably receive projecting protuberances of the litter receptacle.

16. The litter box of claim 13 wherein the cover member has a fastener for selectively removably securing to a lid of the receptacle.

17. The litter box of claim 13 wherein the base arrangement of the litter receptacle compartment includes a pair of slanted slide surfaces to guide the litter receptacle into place in the compartment.

18. The litter box of claim 13 wherein the cover member is coupled to a pair of cam followers pivotably secured to the box.

19. The litter box of claim 18 wherein the upper slide rail and lower slide rail project from a surface of the cam followers in a direction toward the box interior and away from the surrounding wall of the box.

20. The litter box of claim 13, wherein the cover member is movable between a resting position and an open position; and wherein when the cover member is in the resting position, the upper and lower slide rails are horizontal and parallel to the floor of the box; and when the cover member is in the open position, the upper and lower slide rails are angled relative to a plane parallel to the floor at an angle greater than 30°.

* * * * *